US008225252B2

(12) United States Patent
Alcocer Ochoa et al.

(10) Patent No.: US 8,225,252 B2
(45) Date of Patent: Jul. 17, 2012

(54) SYSTEMS, METHODS, APPARATUS AND COMPUTER READABLE MEDIUMS FOR USE IN ASSOCIATION WITH SYSTEMS HAVING INTERFERENCE

(75) Inventors: Alberto Alcocer Ochoa, Jalisco (ME); Keith Raynard Tinsley, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 12/823,723

(22) Filed: Jun. 25, 2010

(65) Prior Publication Data
US 2011/0316561 A1    Dec. 29, 2011

(51) Int. Cl.
G06F 17/50 (2006.01)
G06F 3/00 (2006.01)
G06F 13/00 (2006.01)
G06F 1/12 (2006.01)
G06F 15/177 (2006.01)
G06F 15/16 (2006.01)
H04L 5/00 (2006.01)
G05B 11/01 (2006.01)

(52) U.S. Cl. .......... 716/106; 716/111; 716/136; 703/16; 702/57; 702/111; 702/122; 370/201; 370/242; 324/527; 324/750.01; 710/16; 710/58; 710/107; 710/305; 713/400; 713/500; 713/600; 709/220; 709/223; 709/238; 709/248; 709/250; 700/21; 700/79

(58) Field of Classification Search .................. 716/106, 716/111, 136; 703/16; 702/57, 111, 122; 714/37, 703, 712, 724, 819; 370/201.242; 324/527, 750.01; 710/16, 58, 107, 305; 713/400, 713/500, 600; 709/220, 223, 238, 248, 249, 709/250; 700/21, 79
See application file for complete search history.

(56) References Cited

U.S. PATENT DOCUMENTS
5,131,011 A * 7/1992 Bergmans et al. ............ 375/348
(Continued)

FOREIGN PATENT DOCUMENTS
JP    2007155670 A  *  6/2007

OTHER PUBLICATIONS

Marcel J. E. Golay, "Binary Coding", IRE Professional Group on Information Theory, vol. 4, Issue 4, Sep. 1954, (pp. 23-28, 6 pages total).

(Continued)

*Primary Examiner* — Phallaka Kik
(74) *Attorney, Agent, or Firm* — Buckley, Maschoff & Talwalkar LLC

(57) ABSTRACT

In some embodiments, a method includes characterizing a plurality of channels, each of the plurality of channels being a channel between a location and a respective one of the plurality of communication interfaces; for each of the plurality of communication interfaces, supplying signals to the communication interface and detecting interference that occurs at the location as a result of emissions radiated from the plurality of communication interface while the signals are supplied thereto; for each of the plurality of communication interfaces, determining an estimate of interference that would occur at the location as a result of emissions radiated from the communication interface while the signals are supplied thereto, based at least in part on the characterization of the channel between the location and the communication interface; and for each of the plurality of communication interfaces, comparing the estimate of interference that would occur at the location to the detected interference that occurs at the location.

36 Claims, 12 Drawing Sheets

U.S. PATENT DOCUMENTS

| | | | |
|---|---|---|---|
| 5,799,243 A | 8/1998 | Ojaniemi | |
| 5,802,446 A * | 9/1998 | Giorgi et al. | 455/69 |
| 6,023,622 A | 2/2000 | Plaschke et al. | |
| 6,377,065 B1 * | 4/2002 | Le et al. | 324/750.01 |
| 6,385,237 B1 * | 5/2002 | Tsui et al. | 375/228 |
| 6,578,421 B1 * | 6/2003 | Ishikawa et al. | 73/514.34 |
| 6,606,580 B1 * | 8/2003 | Zedda et al. | 702/185 |
| 6,690,739 B1 * | 2/2004 | Mui | 375/265 |
| 6,732,346 B2 * | 5/2004 | Horne et al. | 716/115 |
| 6,768,729 B1 * | 7/2004 | Ohsuge | 370/342 |
| 7,013,257 B1 * | 3/2006 | Nolan et al. | 703/28 |
| 7,130,776 B2 * | 10/2006 | Ii et al. | 703/2 |
| 7,289,934 B2 * | 10/2007 | Suzuki | 702/176 |
| 7,642,973 B2 * | 1/2010 | Maekawa et al. | 343/703 |
| 7,805,267 B2 * | 9/2010 | Tsubamoto | 702/69 |
| 7,865,801 B2 * | 1/2011 | Vityaev | 714/758 |
| 8,050,843 B2 * | 11/2011 | von Hoff et al. | 701/100 |
| 2002/0178428 A1 * | 11/2002 | Horne et al. | 716/12 |
| 2003/0145296 A1 * | 7/2003 | Chandra et al. | 716/6 |
| 2004/0143428 A1 * | 7/2004 | Rappaport et al. | 703/22 |
| 2005/0127908 A1 * | 6/2005 | Schlicker et al. | 324/240 |
| 2005/0218908 A1 * | 10/2005 | Deutsch et al. | 324/613 |
| 2006/0128372 A1 * | 6/2006 | Gazzola | 455/424 |
| 2006/0132118 A1 * | 6/2006 | Maekawa et al. | 324/96 |
| 2007/0049983 A1 | 3/2007 | Freeberg | |
| 2007/0143719 A1 * | 6/2007 | Chopra et al. | 716/4 |
| 2008/0084953 A1 | 4/2008 | Adduci | |
| 2008/0123760 A1 * | 5/2008 | Oh et al. | 375/260 |
| 2008/0137525 A1 * | 6/2008 | Liu | 370/203 |
| 2009/0073440 A1 * | 3/2009 | Tiemeyer | 356/338 |
| 2009/0089005 A1 * | 4/2009 | Hopcraft et al. | 702/123 |
| 2009/0253898 A1 * | 10/2009 | Engl et al. | 530/350 |
| 2009/0262847 A1 * | 10/2009 | Jo | 375/260 |
| 2009/0265593 A1 * | 10/2009 | Nobekawa | 714/726 |
| 2009/0281750 A1 * | 11/2009 | Natarajan et al. | 702/69 |
| 2010/0023909 A1 * | 1/2010 | Kouzaki | 716/9 |
| 2010/0225466 A1 * | 9/2010 | Liu et al. | 340/514 |
| 2010/0235134 A1 * | 9/2010 | Xiong | 702/117 |
| 2011/0107178 A1 * | 5/2011 | Nakamura et al. | 714/758 |
| 2011/0167297 A1 * | 7/2011 | Su et al. | 714/15 |
| 2011/0185262 A1 * | 7/2011 | Kershaw et al. | 714/776 |
| 2011/0314349 A1 * | 12/2011 | Lee | 714/748 |

OTHER PUBLICATIONS

Marcel J. E. Golay, "Complementary Series", IRE Transactions on Information Theory, vol. 7, Issue 2, Apr. 1961, (pp. 82-87, 6 pages total).

Esmael H. Dinan and Bijan Jabbari, "Spreading Codes for Direct Sequence CDMA and Wideband CDMA Cellular Networks", IEEE Communications Magazine, Sep. 1998, (pp. 48-54, 7 pages total).

Philip A. Bello, "Characterization of Randomly Time-Variant Linear Channels", IEEE Transactions on Communications Systems, Dec. 1963, (pp. 360-393, 33 pages total).

"Notification of Transmittal of the International Search Report and the Written Opinion of the International Searching Authority", dated Feb. 17, 2012, for International Application No. PCT/US2011/041657, 10pgs.

* cited by examiner

SYSTEMS, METHODS, APPARATUS AND COMPUTER READABLE MEDIUMS FOR USE IN ASSOCIATION WITH SYSTEMS HAVING INTERFERENCE

BACKGROUND

Many systems include communication interfaces to allow devices within the system to communicate with one another and/or with other systems. For example, many computer systems include a communication interface that is sometimes referred to as a memory bus in order to transfer information (e.g., addresses and/or data) to and/or from a memory device within the system. As another example, many computer systems also include a communication interface that is sometimes referred to as a peripheral component interconnect (PCI) bus, to transfer information to and/or from a peripheral and/or add-on device within a system.

Unfortunately, the transmission of information over a communication interfaces often results in radiated emissions from the communication interface, which may result in electromagnetic interference (EMI) and/or radio frequency interference (RFI) at various locations within the system. Such interference may make it difficult to satisfy performance requirements for the system.

DETAILED DESCRIPTION

In some embodiments, it may be desirable to identify a communication interface that results in a greatest amount (or at least one of the greatest amounts), an unacceptable amount and/or merely an undesirable amount of interference at a given location of interest.

After such a communication interface is identified, efforts may be made to mitigate such interference, which may thereby improve system performance in one or more respects. Moreover, if such source can be identified and the interference mitigated, it may be possible to reduce spacing between one or more components within the system, which may make it possible to reduce one or more overall dimension of the system and/or to optimize said system for optimal coexistence of computing and communications subsystems, all within a definable volumetric form (e.g., a mobile device).

Figure 1:
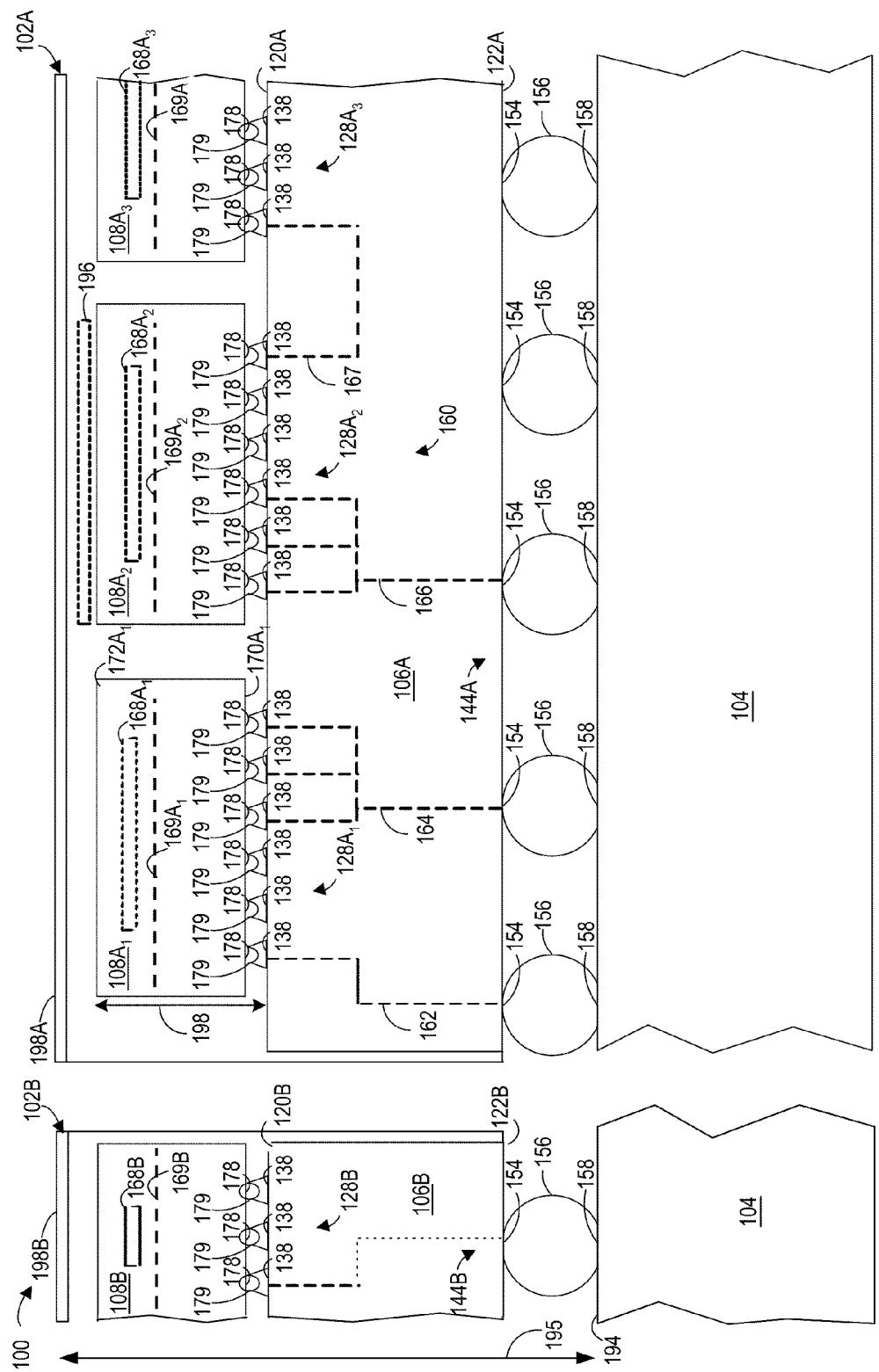
FIG. 1 is a schematic, cutaway, side view of a system according to some embodiments.

FIG. 1 is a schematic, cutaway, side view of one type of system 100 for which it may it may be desirable to identify a communication interface that results in a greatest amount (or at least one of the greatest amounts), an unacceptable amount and/or merely an undesirable amount of interference at a given location of interest, according to some embodiments. Referring to FIG. 1, the system 100 includes a first integrated circuit package 102A, a second integrated circuit package 102B and a circuit board 104. The first integrated circuit package 102A includes an integrated circuit package substrate 106A, a first integrated circuit die $108A_1$, a second integrated circuit die $108A_2$ and a third integrated circuit die $108A_3$. The second integrated circuit package 102B includes an integrated circuit package substrate 106B and an integrated circuit die 108B. The first integrated circuit package 102A and the second integrated circuit package 102B may each include one or more other devices (not shown).

The integrated circuit package substrate 106A may include a first outer surface 120A and a second outer surface 122A. The first outer surface 120A may define mounting areas $128A_1$-$128A_3$ on which the integrated circuits die $108A_1$-$108A_2$ are mounted include a plurality of contacts electrically connected to the electrical devices (sometimes referred to herein as components) mounted thereon. In the illustrated embodiment, mounting area $128A_1$ include contacts 138 electrically connected to the integrated circuit die $108A_1$. Mounting area $128A_2$ include contacts 138 electrically connected to the integrated circuit die $108A_2$. Mounting area $128A_3$ include contacts 138 electrically connected to the integrated circuit die $108A_3$.

The second outer surface 122A may overlay a fractional portion of the circuit board 104 and may define a mounting area 144A mounted to the circuit board 104. The mounting area 144A may include a plurality of contacts 154 electrically connected to the circuit board 104. In some embodiments, the contacts 154 are soldered directly to the contacts 158 in order to mount and electrically connect the integrated circuit package 102A thereto. In some other embodiments, a socket may be disposed between the contacts 154 and contacts 158.

The integrated circuit package substrate 106B may include a first outer surface 120B and a second outer surface 122B. The first outer surface 120B may define a mounting area 128B on which the integrated circuit die 108B is mounted. The mounting area 128B may include a plurality of contacts electrically connected to the electrical devices (sometimes referred to herein as components) mounted thereon. In the illustrated embodiment, mounting area 128B include contacts 138 electrically connected to the integrated circuit die 108B.

The second outer surface 122B may overlay a fractional portion of the circuit board 104 and may define a mounting area 144B mounted to the circuit board 104. The mounting area 144B may include a plurality of contacts 154 electrically connected to the circuit board 104. In some embodiments, the contacts 154 are soldered directly to the contacts 158 in order to mount and electrically connect the integrated circuit package 102B thereto. In some other embodiments, a socket may be disposed between the contacts 154 and contacts 158. In some embodiments, testing may be performed before the first integrated circuit package 102A and/or the second integrated circuit package 102B are mounted to the circuit board 104 so as to help avoid waste of resources in the event that either of the integrated circuit packages 102A-102B is defective.

Some of the contacts 154 may conduct signals to and/or from the circuit board 104. Others of the plurality of contacts 154 may conduct a supply voltage and/or ground to and/or from the integrated circuit packages 102A-102B In some embodiments, the contacts 154 are arranged in an array sometimes referred to as a land grid array (LGA). In some such embodiments, the contacts 154 and the contacts 158 are arranged in corresponding arrays such that each of the contacts 154 is in register with a respective one of the contacts 158. In some embodiments, each of the arrays is a two dimensional array that includes a plurality of rows and a plurality of columns.

In some embodiments, ball contacts 156 are joined to the second outer surface 122A of the substrate 106A and the second outer surface 122B of the substrate 106B and soldered to contacts 158 of the circuit board 104 in order to mount and electrically connect the integrated circuit packages 102A-102B thereto. In some embodiments, the ball contacts 156 are arranged in an array sometimes referred to as a ball grid array (BGA). In some embodiments, the contacts 154, the ball contacts 156 and the contacts 158 are arranged in corresponding arrays such that such that each of the contacts 154 is in register with a respective one of the contacts 156 and a respective one of the contacts 158. In some embodiments, each of the arrays is a two dimensional array that includes a plurality of rows and a plurality of columns.

The substrate 106A may further include a plurality of electrical conductors 162, 164, 166, 167 (e.g., traces and/or vias). The plurality of electrical conductors 162, 164, 166 may connect one or more of the contacts 138 to one or more of the contacts 154 (thereby electrically connecting one or more of the integrated circuit die $108A_1$-$108A_3$ to the circuit board 104). The plurality of electrical conductors 167 may electrically connect one or more of the contacts 138 electrically connected to the integrated circuit die $108A_2$ to one or more of the contacts 138 electrically connected to the integrated circuit die $108A_3$ (to electrically connect the integrated circuit die $108A_2$ to the integrated circuit die $108A_3$).

In the illustrated embodiment, for example, the electrical conductors 162 electrically connect one of the contacts 138 electrically connected to the integrated circuit die $108A_1$ to one of the contacts 154 electrically connected to the circuit board 104. The electrical conductors 164 electrically connect a group of the contacts 138 electrically connected to the integrated circuit die $108A_1$ to another one of the contacts 154 electrically connected to the circuit board 104. The electrical conductors 166 electrically connect a group of the contacts 138 electrically connected to the integrated circuit die $108A_2$ to another one of the contacts 154 electrically connected to the circuit board 104. In some embodiments, the electrical conductors 162 conduct signals to and/or from the circuit board 104. The electrical conductors 164 conduct a supply voltage being supplied to the integrated circuit die $108A_1$. The electrical conductors 166 conduct a ground being supplied to the integrated circuit die $108A_2$. The electrical conductors 167 electrically connect one of the contacts 138 electrically connected to the integrated circuit die $108A_2$ to one of the contacts 138 electrically connected to the integrated circuit die $108A_3$.

Although not shown in FIG. 1, the plurality of electrical conductors 160 may also include one or more electrical conductors to electrically connect integrated circuit die $108A_1$ to integrated circuit die $108A_2$, to electrically connect integrated circuit die $108A_1$ to integrated circuit die $108A_3$, and/or to electrically connect any of the components to one or more other components.

Each of the integrated circuit die $108A_1$-$108A_3$, 108B may include one or more integrated circuits disposed on a substrate. For example, integrated circuit die $108A_1$ includes one or more integrated circuits $168A_1$ disposed on substrate $169A_1$. Integrated circuit die $108A_2$ includes one or more integrated circuits $168A_2$ disposed on substrate $169A_2$. Integrated circuit die $108A_3$ includes one or more integrated circuits $168A_3$ disposed on substrate $169A_3$. Integrated circuit die 108B includes one or more integrated circuits 168B disposed on substrate 169B. The one or more integrated circuits may comprise active and/or passive components. The substrate may comprise a semiconductor substrate and/or any other type of substrate.

The integrated circuit die $108A_1$ includes a first outer surface $170A_1$ and a second outer surface $172A_1$. In some embodiments, the first outer surface $170A_1$ and the second outer surface $172A_1$ are opposite major outer surfaces, for example, as shown. The first outer surface $170A_1$ may define a plurality of contacts 178 electrically connected to one or more of the one or more integrated circuits 168 of the integrated circuit die $108A_1$.

As stated above, the integrated circuit die $108A_1$-$108A_3$, 108B may be mounted to the first outer surface 120A, 120B, respectively, of the substrate 106A, 106B, respectively. In some embodiments, bump contacts 179 are joined to the contacts 178 of the integrated circuit die $108A_1$-$108A_3$, 108B and soldered to the contacts 138 of the substrate 106A, 106B, respectively, in order to mount and electrically connect the integrated circuit die $108A_1$-$108A_3$, 108B, respectively, thereto.

In some embodiments, testing is performed before the integrated circuit die-bump contact assembly is mounted to the substrates 106A, 106B so as to help avoid waste of resources in the event that one or more of the integrated circuit die $108A_1$-$108A_3$, 108B is defective.

In some embodiments, the contacts 138, the contacts 178 and the bump contacts 179 are arranged in corresponding arrays such that such that each of the contacts 138 is in register with a respective one of the contacts 178 and a respective one of the bump contacts 179. In some embodiments, each of the arrays is a two dimensional array that includes a plurality of rows and a plurality of columns. The number of rows in each array and/or the number of columns in each array may depend at least in part on a number of contacts 138 that may be desired for the integrated circuit die $108A_1$-$108A_3$, 108B.

In some embodiments, the first integrated circuit package 102A and/or the second integrated circuit package 102B may include wirebond type connections (sometimes referred to herein as bond wires) to one or more of the integrated circuit die in lieu of and/or in addition to the bump contacts 179.

In some embodiments, testing is performed before the integrated circuit die is mounted to the substrate 106 so as to help avoid waste of resources in the event that one or more of the integrated circuit die $108A_1$-$108A_3$, 108B is defective.

The circuit board 104 includes a first outer surface 194. In some embodiments, the first outer surface 194 comprises a first major outer surface. The first outer surface 194 may define the plurality of contacts 158 electrically connected to the integrated circuit package 102A and/or the second integrated circuit package 102B.

The circuit board 104 may comprise any type of circuit board. In some embodiments, the circuit board 104 comprises a multi-layer laminate that is rigid and/or at least substantially rigid so as to provide support for the components mounted thereon. In some embodiments, the circuit board 104 comprises a printed circuit board. In some embodiments, the circuit board 104 comprises a processor board and/or a motherboard.

In some embodiments, the circuit board 104 is attached to a chassis (not shown) or some other structure (not shown).

In some embodiments, one or more components of the integrated circuit packages 102A, 102B are selected so as to keep the overall dimensions of the integrated circuit packages 102A, 102B within predetermined limits. In some embodiments, for example, one or both of the integrated circuit package 102A, 102B has a height 195 (e.g., measured from the first outer surface 194 of the circuit board 104) of not greater than 2.85 millimeters (mm).

In some embodiments, the system 100 further includes a heat sink 196, which may improve thermal conductivity between the system 100 and a surrounding environment in which the system may be employed, and may thereby help make it possible for the system to deliver greater performance (e.g., speed) all else being equal. In some embodiments, the heat sink 196 comprises a one piece, integrally formed, "finned" heat sink. The fins, which may have any size and shape, may improve thermal conductivity between the heat sink 196 and the surrounding environment. In some embodiments, the heat sink 196 comprises metal so as to help provide a high thermal conductivity. In some embodiments, the heat sink 196 may be attached to one or more other structures (not shown). The integrated circuit package may further include mechanical clips (not shown) that mechanically connect the heat sink 196 to the circuit board 104. In some embodiments, a thermal interface material (not shown) may be disposed between the integrated circuit die $108A_2$ and the heat sink 196. In some embodiments, the thermal interface material is used to mount the heat sink 196 to the integrated circuit die $108A_2$ and/or to another portion of the integrated circuit package 102A.

In some embodiments, the integrated circuit package 102A and/or the integrated circuit package may include a lid 198A, 198B, respectively. In some embodiments, the lid 198A and the substrate 106A collectively define a hermetically seal. In some embodiments, the lid 198B and the substrate 106B collectively define a hermetically seal.

Although the substrates 106A, 106B, and the integrated circuit die $108A_1$-$108A_3$, 108B are shown having a surface mountable form, in some embodiments, the substrates 106A-106B and the integrated circuit die $108A_1$-$108A_3$, 108B may not have a surface mountable form.

In some embodiments, one or more of the integrated circuit die $108A_1$-$108A_3$, 108B comprises a memory device for storing data and/or other information. In some embodiments, the memory device comprises a Single Data Rate Random Access Memory, a Double Data Rate Random Access Memory or a Programmable Read Only Memory.

In some embodiments, one or more additional integrated circuit packages is mounted on the printed circuit board 104.

In some embodiments, one or more of the conductors shown in FIG. 1 belongs to a communication interface. In some embodiments, a plurality of communication interfaces may be employed.

Figure 2:
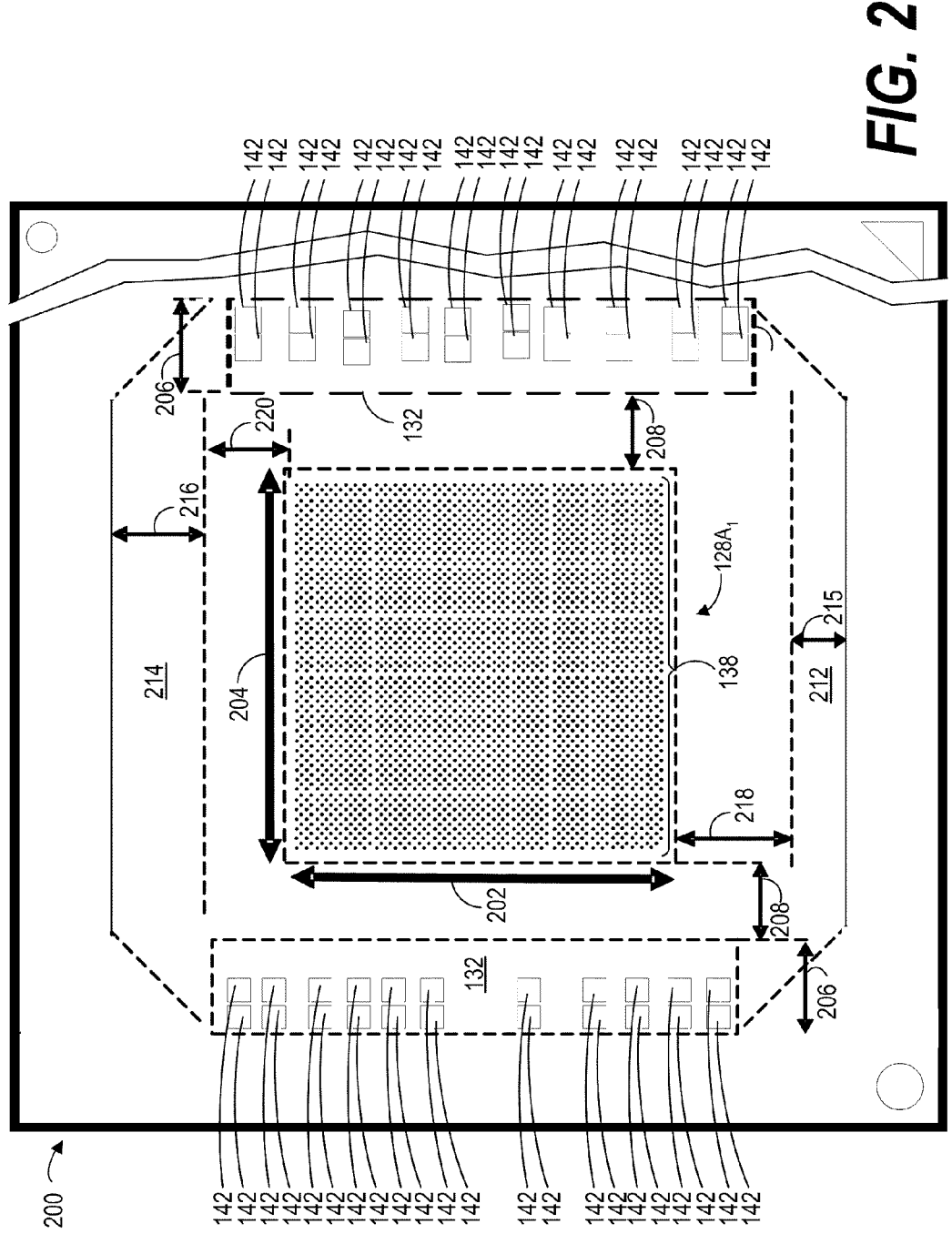
FIG. 2 is a schematic plan view of a portion of a substrate according to some embodiments.

FIG. 2 is a schematic plan view of a portion 200 of the substrate 106A, according to some embodiments.

Referring to FIG. 2, in accordance with some embodiments, the mounting area $128A_1$ for the integrated circuit die $108A_1$ may have a length 202 of about 10.5 mm and a width 204 of about 10.5 mm. A mounting area for 132 for capacitors may have a width 206 of about 2.7 mm. A distance 208 between the mounting area $128A_1$ for the integrated circuit die $108A_1$ and the mounting areas 132 may be about 2 mm.

The first outer surface 120A of the substrate 106A may further define areas 212, 214. The area 212 may have a width 215 of about 1.7 mm. The area 214 may have a width 216 of about 2.7 mm. A distance 218 between the mounting area $128A_1$ for the integrated circuit die $108A_1$ and the area 212 may be about 3 mm. A distance 220 between the mounting area 128 for the integrated circuit die $108A_1$ and the area 214 may be about 2 mm.

The contacts 138 are represented by circles however the contacts 138 may have any configuration.

The integrated circuit packages 102A-102B may be fabricated using any suitable fabrication technique and may provide any functions to system 100. In some embodiments, one or more circuits of one or more of the integrated circuit die $108A_1$-$108A_3$, 108B define a processor. In some embodiments, a processor comprises a microprocessor and/or communication processor. In some embodiments, a communication processor is adapted to perform one or more communication intensive processes.

In some embodiments, one or more of the integrated circuit die, e.g., the first integrated circuit die $108A_1$, comprises a processor. In some embodiments, the first integrated circuit die $108A_1$ and the second integrated circuit die $108A_2$ comprise a first processor and a second processor, respectively. In some embodiments, the first integrated circuit die $108A_1$ and the second integrated circuit die $108A_2$ comprise a processor and a co-processor, respectively. In some embodiments, the first integrated circuit die $108A_1$ and the second integrated circuit die $108A_2$ comprise a processor and a graphics processor, respectively. In some embodiments, one or more of the integrated circuit die, e.g., the third integrated circuit die $108A_3$, comprises a memory device. In some embodiments, the third integrated circuit die $108A_3$ comprises a DDR3 type of memory device. In some embodiments, one or more of the integrated circuit die, e.g., integrated circuit die 108B, comprises a peripheral and/or add-on device. In some embodiments, the integrated circuit die 108B comprises an application specific integrated circuit (ASIC).

As used herein, a processor may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. Software may include, but is not limited to, instructions stored on a computer readable medium, such as, for example, punch cards, paper tape, magnetic or optical disk, magnetic or optical tape, CD-ROM, DVD, RAM, EPROM, or ROM. A processor may employ continuous signals, periodically sampled signals, and/or any combination thereof.

As used herein, a microprocessor may comprise any type of microprocessor. For example, a microprocessor may be programmable or non programmable, general purpose or special purpose, dedicated or non dedicated, distributed or non distributed, shared or not shared, and/or any combination thereof. A microprocessor may include, but is not limited to, hardware, software, firmware, and/or any combination thereof. Software may include, but is not limited to, instructions stored on a computer readable medium, such as, for example, punch cards, paper tape, magnetic or optical disk, magnetic or optical tape, CD-ROM, DVD, RAM, EPROM, or ROM. A microprocessor may employ continuous signals, periodically sampled signals, and/or any combination thereof.

As used herein, a communication processor may comprise any type of communication processor. For example, a communication processor may be programmable or non programmable, general purpose or special purpose, dedicated or non dedicated, distributed or non distributed, shared or not shared, and/or any combination thereof. A communication processor may include, but is not limited to, hardware, software, firmware, and/or any combination thereof. Software may include, but is not limited to, instructions stored on a computer readable medium, such as, for example, punch cards, paper tape, magnetic or optical disk, magnetic or optical tape, CD-ROM, DVD, RAM, EPROM, or ROM. A communication processor may employ continuous signals, periodically sampled signals, and/or any combination thereof.

In some embodiments, some of the electrical conductors within the system 100 are part of one or more communication interfaces that connect to one or more of the integrated circuit die $108A_1$-$108A_3$, 108B.

Figure 3:
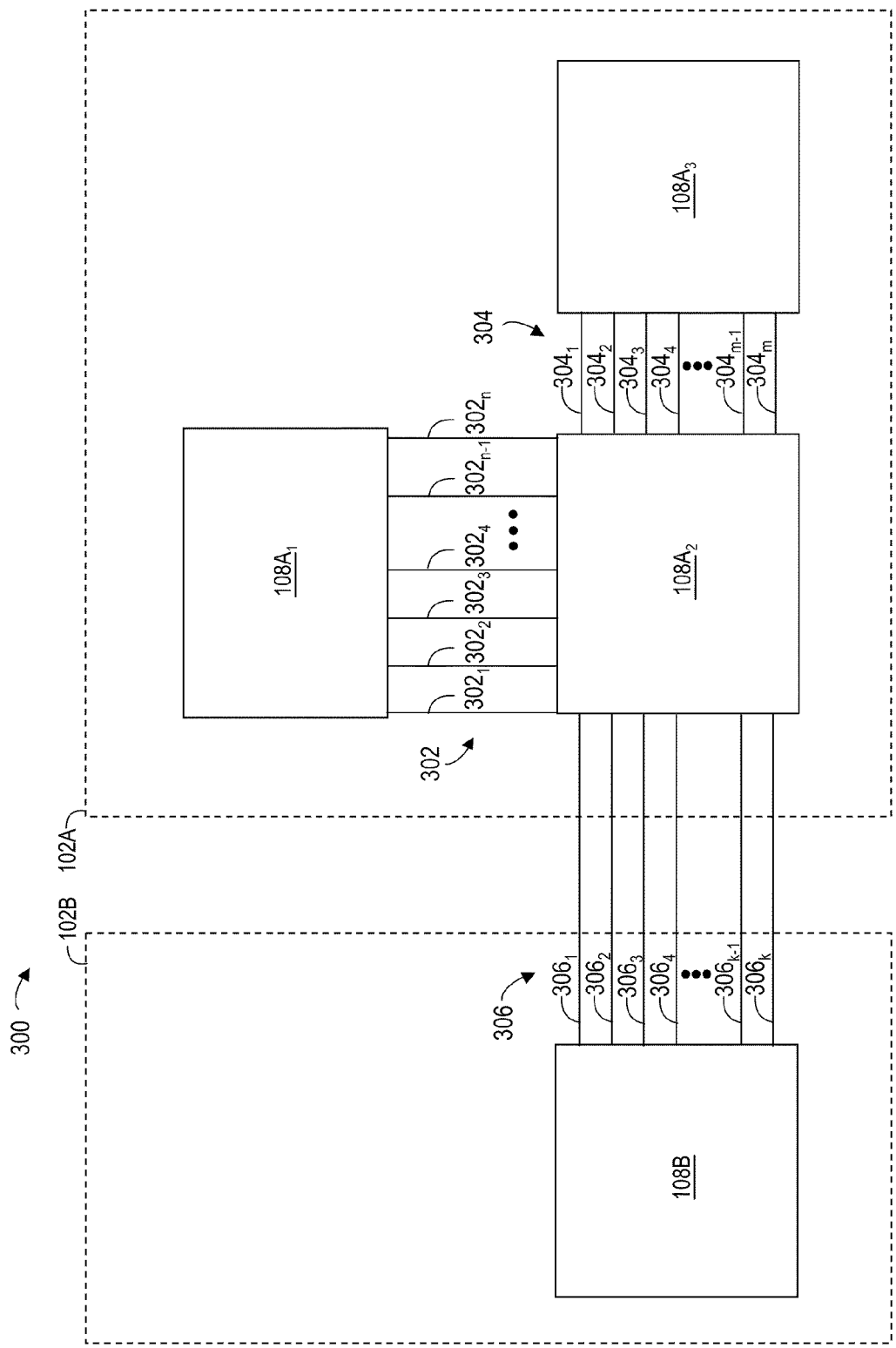
FIG. 3 is a schematic diagram of a portion of a system according to some embodiments.

FIG. 3 is a schematic diagram of a portion 300 of the system 100 showing a plurality of communication interfaces that may connect to the integrated circuit die $108A_1$-$108A_3$, 108B, according to some embodiments.

Referring to FIG. 3, in some embodiments, the system 100 may include a first communication interface 302, a second communication interface 304 and a third communication interface 306. The first communication interface 302 may have a first end connected to the first integrated circuit die $108A_1$ of the first integrated circuit package 102A and a second end connected to the second integrated circuit die $108A_2$ of the first integrated circuit package 102A to thereby connect the first integrated circuit die $108A_1$ of the first integrated circuit package 102A to the second integrated circuit die $108A_2$ of the first integrated circuit package 102A. The second communication interface 304 may have a first end connected to the second integrated circuit die $108A_2$ of the first integrated circuit package 102A and a second end connected to the third integrated circuit die $108A_3$ of the first integrated circuit package 102A to thereby connect the second integrated circuit die $108A_2$ of the first integrated circuit package 102A to the third integrated circuit die $108A_3$ of the first integrated circuit package 102A. The third communication interface 306 may have a first end connected to the first integrated circuit die $108A_1$ of the first integrated circuit package 102A and a second end connected to the integrated circuit die 108B of the second integrated circuit package 102B to thereby connect the first integrated circuit die $108A_1$ of the first integrated circuit package 102A to the integrated circuit die 108B of the second integrated circuit package 102B.

Each of the communication interfaces may include any number of electrical conductors. In some embodiments, each of the communication interfaces a plurality of conductors. However, in some other embodiments, one or more of the communication interfaces may include only one electrical conductor.

With the connections above, each of the communication interfaces 302-306 is internal to the system 100 and may therefore be referred to as internal communication interfaces for the system 100. The first communication interface 302 and the second communication interface 304 are also internal to the first integrated circuit package 102A and may therefore also be referred to as internal communication interfaces for the first integrated circuit package 102A. The third communication interface extends outside the first integrated circuit package 102A and may therefore also be referred to as an external communication interface for the first integrated circuit package 102A.

In some embodiments, other configurations may be employed. In some embodiments, one or more of the communication interfaces may connect more than two integrated circuit die. In some embodiments, one or more of the communication interfaces 302-306 may extend outside of the system. In some embodiments, one or more other communication interfaces may be employed with or without one or more of the communication interfaces 302-306.

Unless stated otherwise, the communication interfaces may comprise any type of communication interfaces. In some embodiments, one or more of the plurality of communication interfaces is a bus and/or an interconnection (e.g., a wired interconnection). In some embodiments, one or more of the communication interfaces is not limited to a bus and/or wired interconnection.

In some embodiments, one or more of the communication interfaces, e.g., the second communication interface 304, comprises a memory bus to transfer information (e.g., addresses and/or data) to and/or from one or more memory devices within the system. As stated above, in some embodiments, one or more of the integrated circuit die, e.g., the third integrated circuit die $108A_3$, comprises a memory device. In some embodiments, the memory bus comprises a DDR3 type of memory bus.

In some embodiments, one or more of the communication interfaces, e.g., the third communication interface 306, comprises a PCI bus to transfer information to and/or from one or more peripheral and/or add-on devices. As stated above, in some embodiments, one or more of the integrated circuit die, e.g., integrated circuit die 108B, comprises a peripheral and/or add-on device. In some embodiments, the PCI bus comprises a PCI Express bus.

In some embodiments, it may be desirable to identify a communication interface that results in a greatest amount (or at least one of the greatest amounts), an unacceptable amount and/or merely an undesirable amount of interference at a given location of interest, according to some embodiments.

Figure 4:
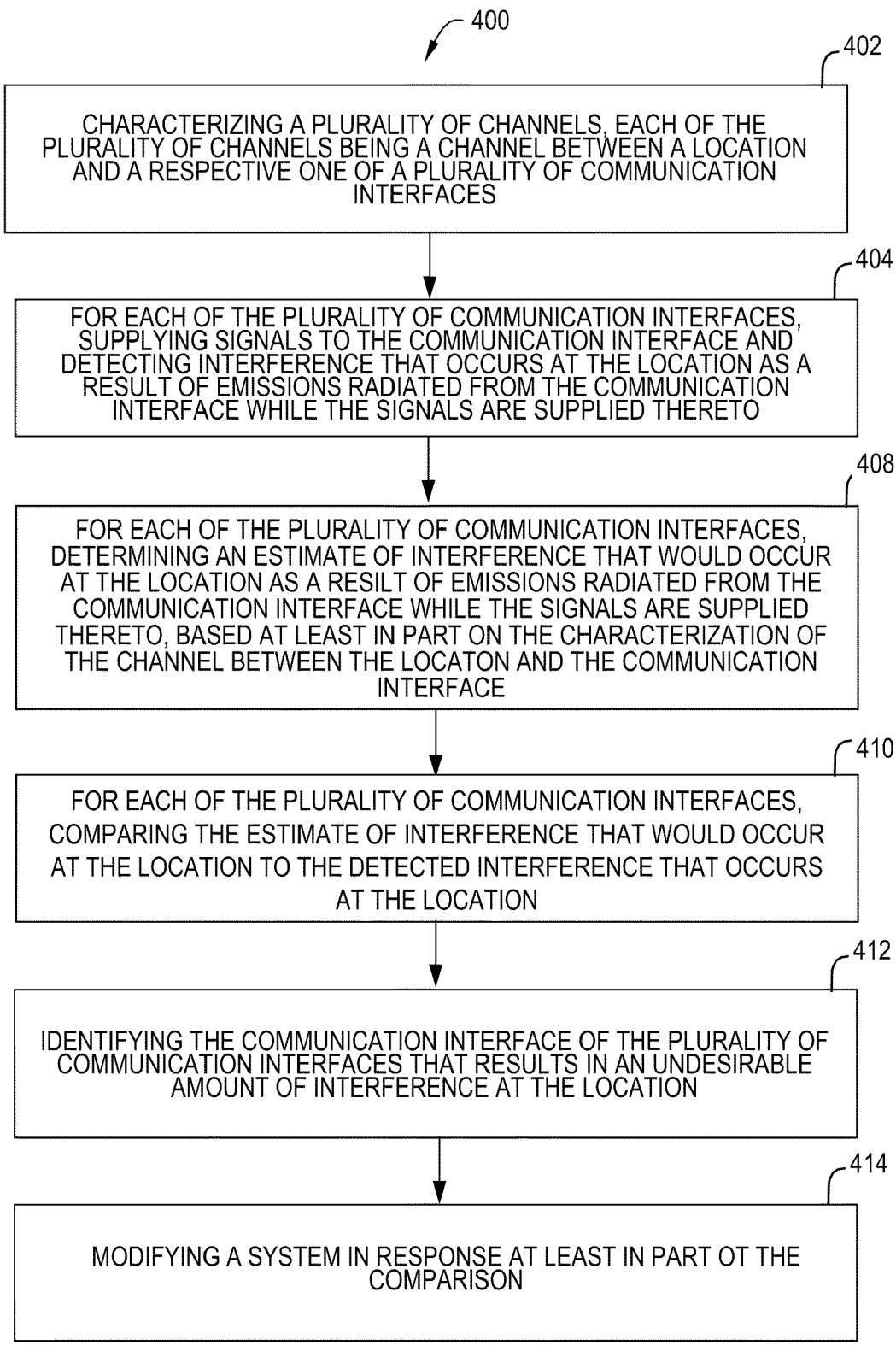
FIG. 4 is a flow diagram of a method according to some embodiments.

FIG. 4 is a flow diagram of a method 400 according to some embodiments. In some embodiments, the method 400 may be used in identifying a communication interface that results in a greatest amount (or at least one of the greatest amounts), an unacceptable amount and/or merely an undesirable amount of interference at a given location of interest, according to some embodiments. In some embodiments, one or more portions of method 400 may be performed by an integrated circuit manufacturer. In some embodiments, one or more portions of method 400 may be performed by a system integrator. In some embodiments, one or more portions of method 400 may be performed manually.

The method 400 is not limited to the order shown in the flow diagram. Rather, embodiments of the method 400 may be performed in any order that is practicable. For that matter, unless stated otherwise, any method disclosed herein may be performed in any order that is practicable.

Referring to FIG. 4, at 402, the method may include characterizing a plurality of channels, each of the plurality of channels being a channel between a location and a respective one of the plurality of communication interfaces. Unless stated otherwise, a location and/or location of interest may comprise any type of location and/or location of interest, respectively. In some embodiments, a location and/or location of interest may be as small as a single point in space. In some other embodiments, a location and/or location of interest may comprise a region and/or region of interest, respectively, that is larger than a single point in space. In some embodiments, a location and/or location of interest may comprise a three dimensional region that is as large as test personnel feel is appropriate and/or may be desired to accomplish a particular objective.

In some embodiments, characterizing a channel between a location and a respective one of the communication interfaces comprises: dividing conductors of the respective one of the communication interface into groups; supplying signals to one of the groups at a time, and for each of the groups, detecting interference that occurs at the location as a result of emissions radiated from the group while the signals are supplied thereto and thereafter characterizing a channel between the location and the group.

In some embodiments, a channel between the location and a group of conductors is characterized by estimating a channel power delay profile (PDP) or other statistical measure of average power or statistical measure of behavior based at least in part on the interference that was detected at the location of interest with the signals supplied to the group.

In some embodiments, each of the groups has a same number of conductors. In some embodiments, the number of conductors in each group is two (sometimes referred to as a pair of conductors).

Figure 5:
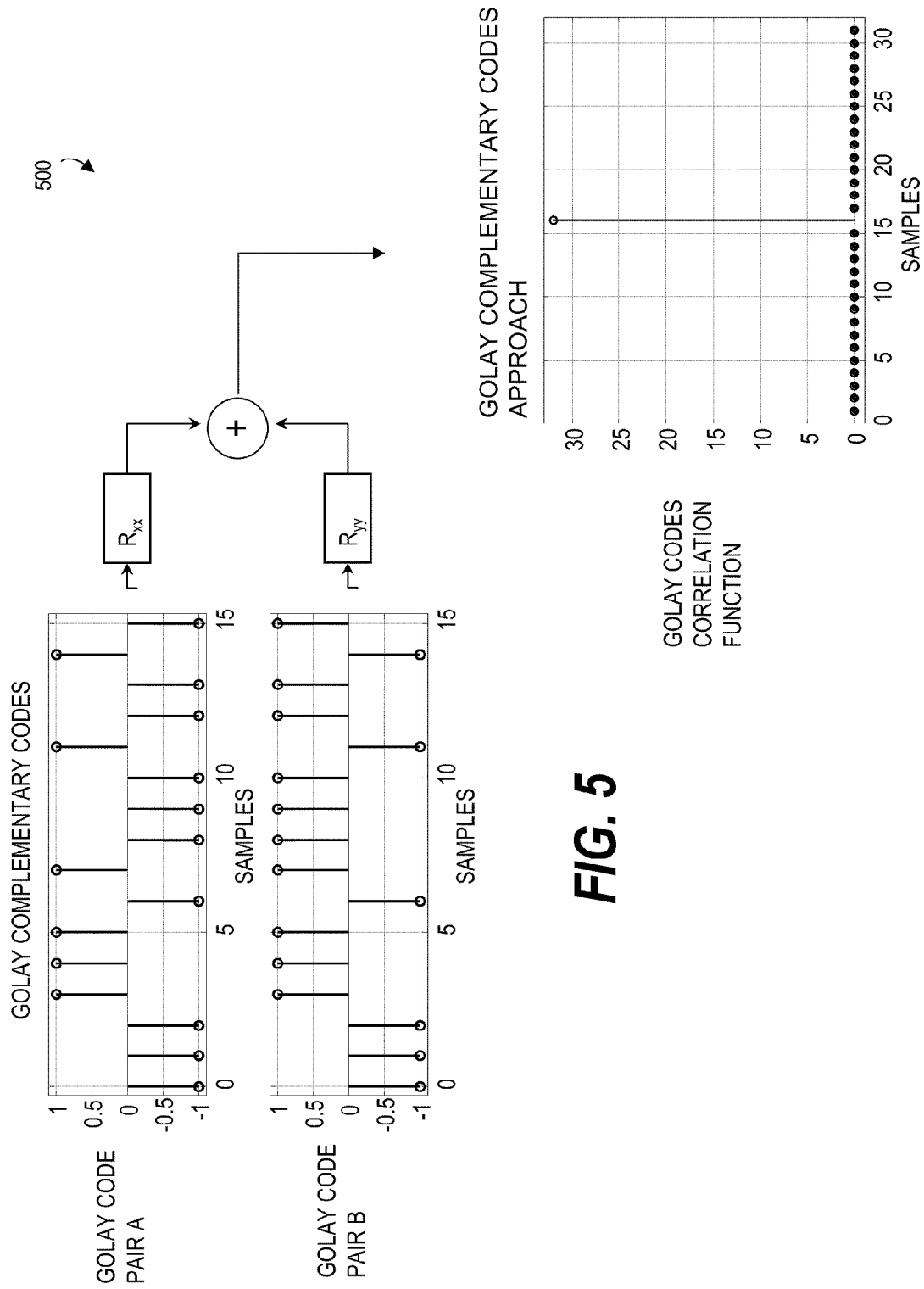
FIG. 5 is a graphical representation of characteristics of Golay codes, in accordance with some embodiments.

In some embodiments, the signals are Golay encoded signals. If the number of conductors in a group is equal to two, a first Golay encoded signal may be supplied to a first conductor in the group and a second Golay encoded signals may be supplied to a second conductor in the group. In some embodiments, the Golay encoded signals may have the characteristics shown in FIG. 5, which is a representation of channel sounding characteristics of Golay Complementary Codes, in accordance with some embodiments. In accordance with some embodiments, Golay Complementary Codes (GCC) is a set of sequences, not necessarily orthogonal, with some interesting cross correlation properties: let us assume that A and B are some Golay complementary codes, then, $$R_A(n)+R_B(n)=2N\delta(n), \quad (A.1)$$

where $R_X$ stands for the autocorrelation of the code X, N is the length of the sequence, $\delta(n)$ is the delta function and n denotes the time index. In some embodiments, there is not so easy way to create this pair of sequences, but a set of 8-bit long codes appears in Table 1, which is a list of 8-bit long Golay complementary codes, and it can be used to create larger GCC.

TABLE 1

| No | Sequence A | Sequence B |
|---|---|---|
| 1 | 00011101 | 00010010 |
| 2 | 01001000 | 00011101 |
| 3 | 00010010 | 10111000 |
| 4 | 11101101 | 00011101 |
| 5 | 11101101 | 11100010 |
| 6 | 01000111 | 01001000 |
| 7 | 10111000 | 00010010 |
| 8 | 10111000 | 01001000 |

In some embodiments, larger codes can be created as follows: as $1^{st}$ sequence consider [A B] and then [A-B] for the second.

Figure 6:
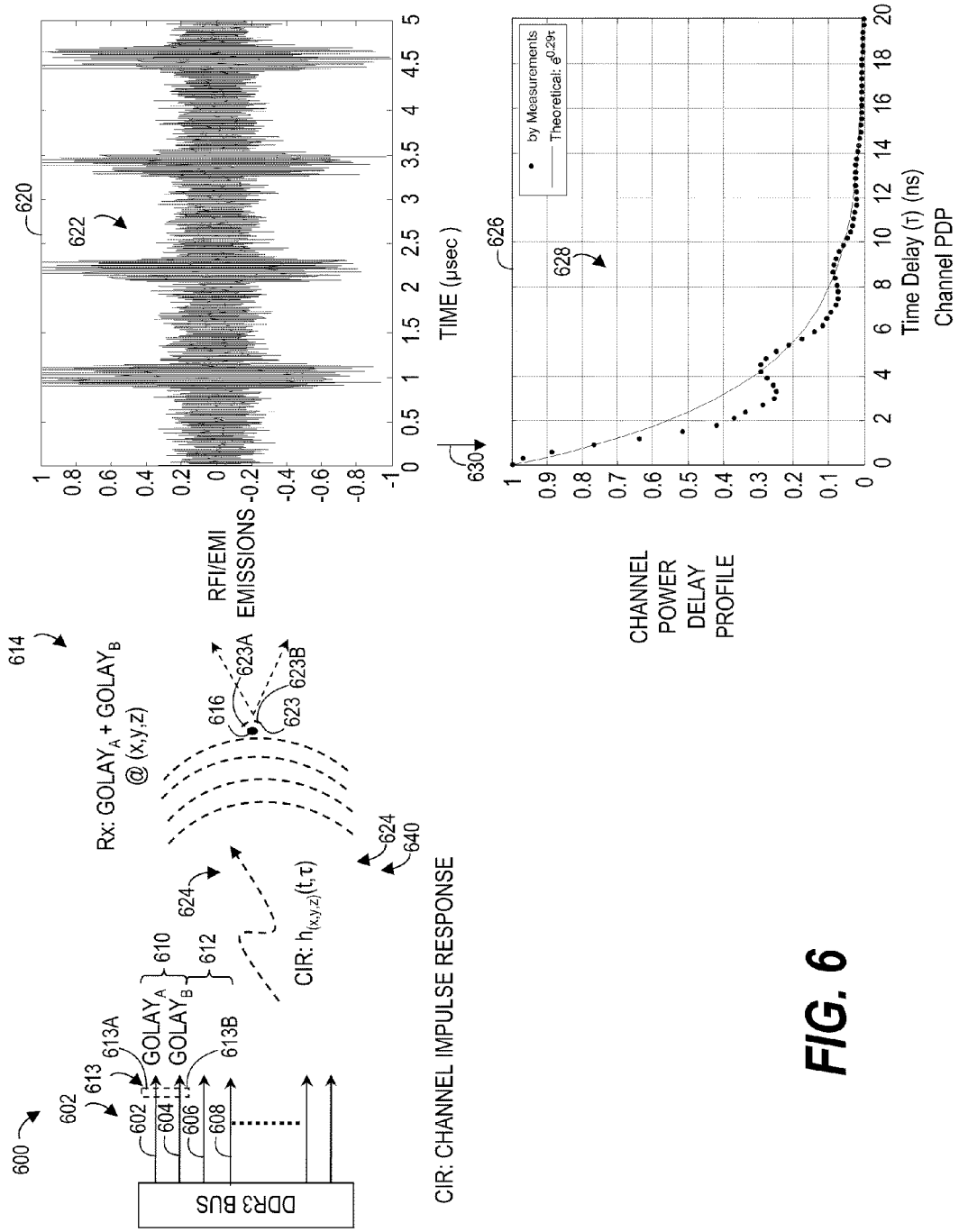
FIG. 6 is a graphical representation of a portion of a method, in accordance with some embodiments.

FIG. 6 is a graphical representation 600 showing the above with Golay encoded signals, in accordance with some embodiments.

Referring to FIG. 6, in accordance with some embodiments, a communication interface 602, i.e., a DDR3 BUS or other communication interface, includes a plurality of conductors, e.g., conductors 602, 604, 606, 608. The plurality of conductors may be divided into groups, e.g., 610, 612. A first signal, i.e., $GOLAY_A$ or other signal, may be supplied to the first conductor 602 in the group. A second signal, i.e., $GOLAY_B$ or other signal, may be supplied to the second conductor 604 in the group.

In some embodiments, a transmitter 613 may be used to supply the signals. In some embodiments, the transmitter 613 is electrically connected to the group of conductors. In some embodiments, the transmitter 613 comprises a plurality of transmitters, e.g., 613A, 613B. In some embodiments, the transmitter 613 is disposed within the system 100. In some embodiments, the transmitter 613 is disposed within an integrated circuit package, e.g., the first integrated circuit package 102A or the second integrated circuit package 102B. In some embodiments, the transmitter 613 may comprise circuitry within the system 100 and/or within the first integrated circuit package 102A or the second integrated circuit package 102B.

The signals supplied to the group may result in interference 614, which may have different characteristics at different locations. The interference may be detected at one or more locations of interest, e.g., location 616. A graph 620 has a waveform 622 representing the interference that may be detected at location 616, in accordance with some embodiments.

In some embodiments, a receiver 623 may be used to detect the interference at location 616. In some embodiments, the receiver may comprise a near field scanner antenna (NFS). In some embodiments, the receiver 623 comprises a plurality of receivers, e.g., 623A, 623B.

The receiver 623 may or may not be disposed at the location. Thus, in some embodiments, the receiver 623 may be disposed at the location 616. In some other embodiments, the receiver 623 may not be disposed at the location 616.

In some embodiments, the location 616 and the receiver 623 are disposed within the system 100. In some embodiments, the location 616 and the receiver 623 are disposed within an integrated circuit package, e.g., the first integrated circuit package 102A or the second integrated circuit package 102B. In some embodiments, the receiver may comprise circuitry within the system 100 and/or within the first integrated circuit package 102A or the second integrated circuit package 102B.

A channel, e.g., 624, between the location 616 and the group 610 may thereafter be characterized by estimating a channel power delay profile (PDP) or other statistical measure of average power or statistical measure of behavior, based at least in part on the interference that was detected at the location of interest with the signals supplied to the group. A graph 626 has a waveform 628 representing an estimated channel power delay profile (PDP).

A transformation 630 may be used to generate the estimated channel power delay profile (PDP), based at least in part on the interference that was detected at the location of interest with the signals supplied to the group.

In some embodiments, the above may be repeated for each group of conductors in the communication interface 602 and each group of conductors in each of the other communication interfaces.

For example, in some embodiments, the signals may eventually be removed from the first pair of conductors 604-606 and supplied to the second pair of conductors 606-608. The signals on the second pair of conductors 606-608 may also result in interference, which may also have different characteristics at different locations, and may also be detected at one or more of such locations, e.g., location 616. In some embodiments, this may be repeated until the signals have been supplied to all pairs of conductors in each of the plurality of communication interfaces, and the resulting interference has been detected at one or more locations of interest, e.g., location 616.

In accordance with some embodiments, the interference detected at location 616 with respect to any given pair of conductors depends at least in part, on the signals supplied to the pair of conductors and the characteristics of the channel that exists between the pair of conductors and location 616.

For example, the interference detected at location 616 with respect to the first pair of conductors 610 depends at least in part on the signals supplied to such pair of conductors and the characteristics of a channel 624, between the first pair of conductors 610 and the location 616.

Likewise, in some embodiments, the interference detected at location 616 with respect to the second pair of conductors 612 depends at least in part on the signals supplied to such pair of conductors and the characteristics of a channel 640, between the second pair of conductors 612 and the location 616.

Although at quick glance channels 624 and 640 may appear to be the exact same as one another, in some embodiments, there may be differences between the two so that they are not exactly the same as one another. In accordance with some embodiments, the location 616 may have a different channel to each pair of conductors in the plurality of communication interfaces.

Figure 7:
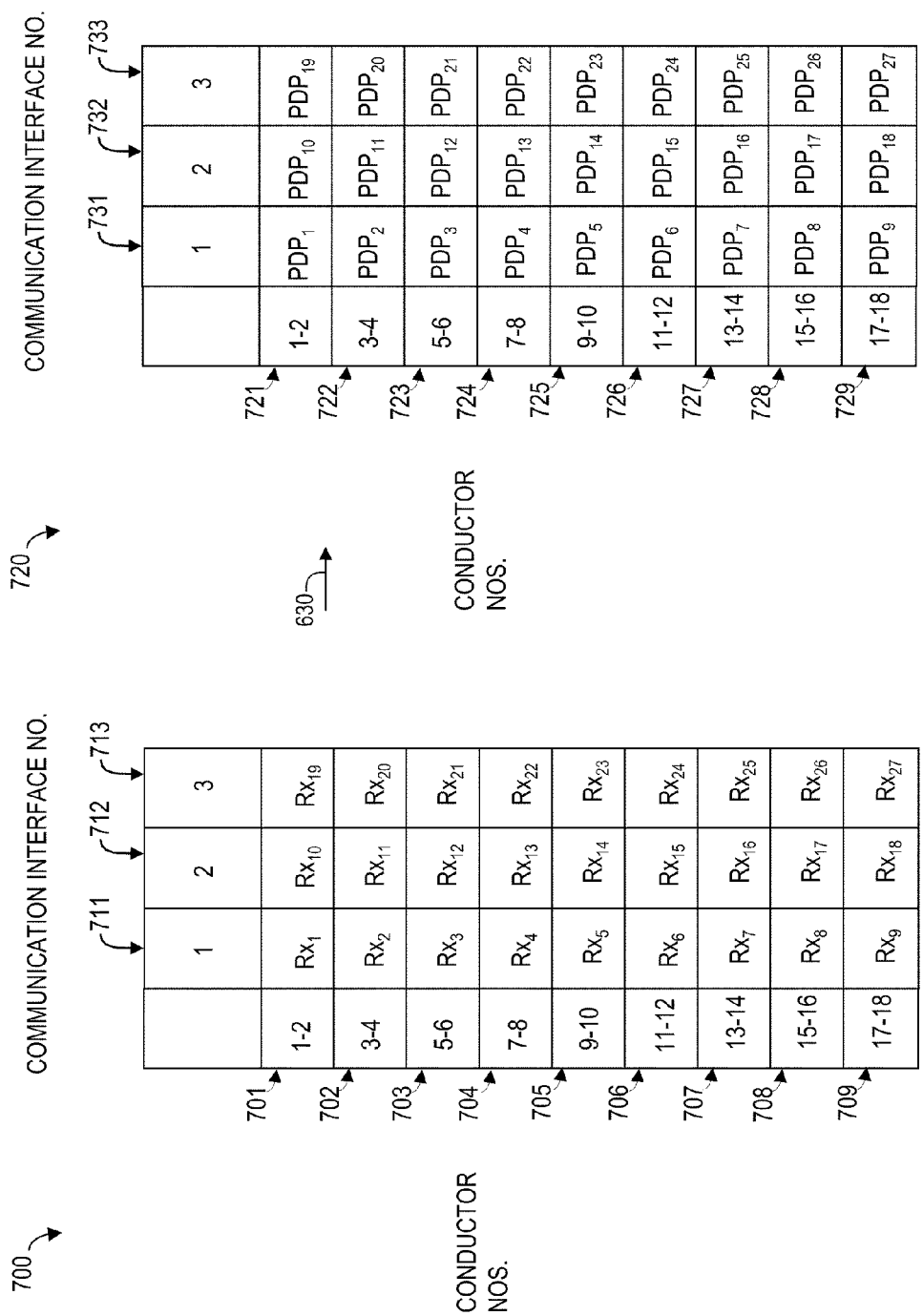
FIG. 7 is a table representing interference detected at a location of interest, in accordance with some embodiments.

FIG. 7 shows a table 700 having a plurality of cells arranged in a plurality of rows 701-709 and columns 711-713, in accordance with some embodiments.

Each cell in the table 700 contains information, $Rx_1$-$Rx_{27}$, indicative of the interference that was detected at location 616 with signals supplied to a particular group of conductors. For example, a first cell in the table 700 includes information, $Rx_1$, indicative of the interference (see e.g., waveform 622) that may have been detected at location 616 with signals supplied to the first group of conductors 610 in the communication interface 602. A second cell in the table 700 includes information, $Rx_2$, indicative of the interference that may have been detected at location 616 with signals supplied to the second group of conductors 612 in the communication interface 602. And so on.

FIG. 7 also shows a table 720 having a plurality of cells arranged in a plurality of rows 721-729 and columns 731-733, in accordance with some embodiments.

Each cell in the table 720 contains information, $PDP_1$-$PDP_{27}$, indicative of a characterization of a channel between the location 616 and a particular group of conductors. For example, a first cell in the table 720 includes information, $PDP_1$, indicative of a characterization of the channel (e.g., channel 624) between the location 616 and the first group of conductors 610 in the communication interface 602. A second cell in the table 700 includes information, $PDP_2$, indicative of a characterization of the channel between the location 616 and the second group of conductors 610 in the communication interface 602. And so on.

In some embodiments, the characterization, e.g., PDP, in each cell of table 720 is generated by applying the transformation 630 to the interference, e.g., Rx, in the corresponding cell in the table 700.

In some embodiments, characterizing a channel between a location and a respective one of the communication interfaces comprises: dividing conductors of the respective one of the communication interface into groups; supplying signals to one of the groups at a time, and for each of the groups, detecting interference that occurs at the location as a result of emissions radiated from the group while the signals are supplied thereto and thereafter characterizing a channel between the location and the group.

In some embodiments, a channel between the location and a group of conductors is characterized by estimating a channel power delay profile (PDP) or other statistical measure of average power or statistical measure of behavior based at least in part on the interference that was detected at the location of interest with the signals supplied to the group.

Referring again to FIG. 4, at 404, the method may further include, for each of the plurality of communication interfaces, supplying signals to the communication interface and detecting interference that occurs at the location as a result of emissions radiated from the plurality of communication interface while the signals are supplied thereto. In some embodiments, the signals are supplied to, and the resulting interference is detected from, one communication interface at a time.

In some embodiments, a different signal is supplied to each conductor in the communication interface. In some embodiments, the signals supplied to the communication interface are signals having low cross correlation properties. In some embodiments, the signals supplied to the communication interface also have autocorrelation properties. In some embodiments, the signals supplied to the communication interface are Gold encoded signals. In some embodiments, the Gold encoded signals may have the characteristics shown in FIG. 8A.

Figure 8A:
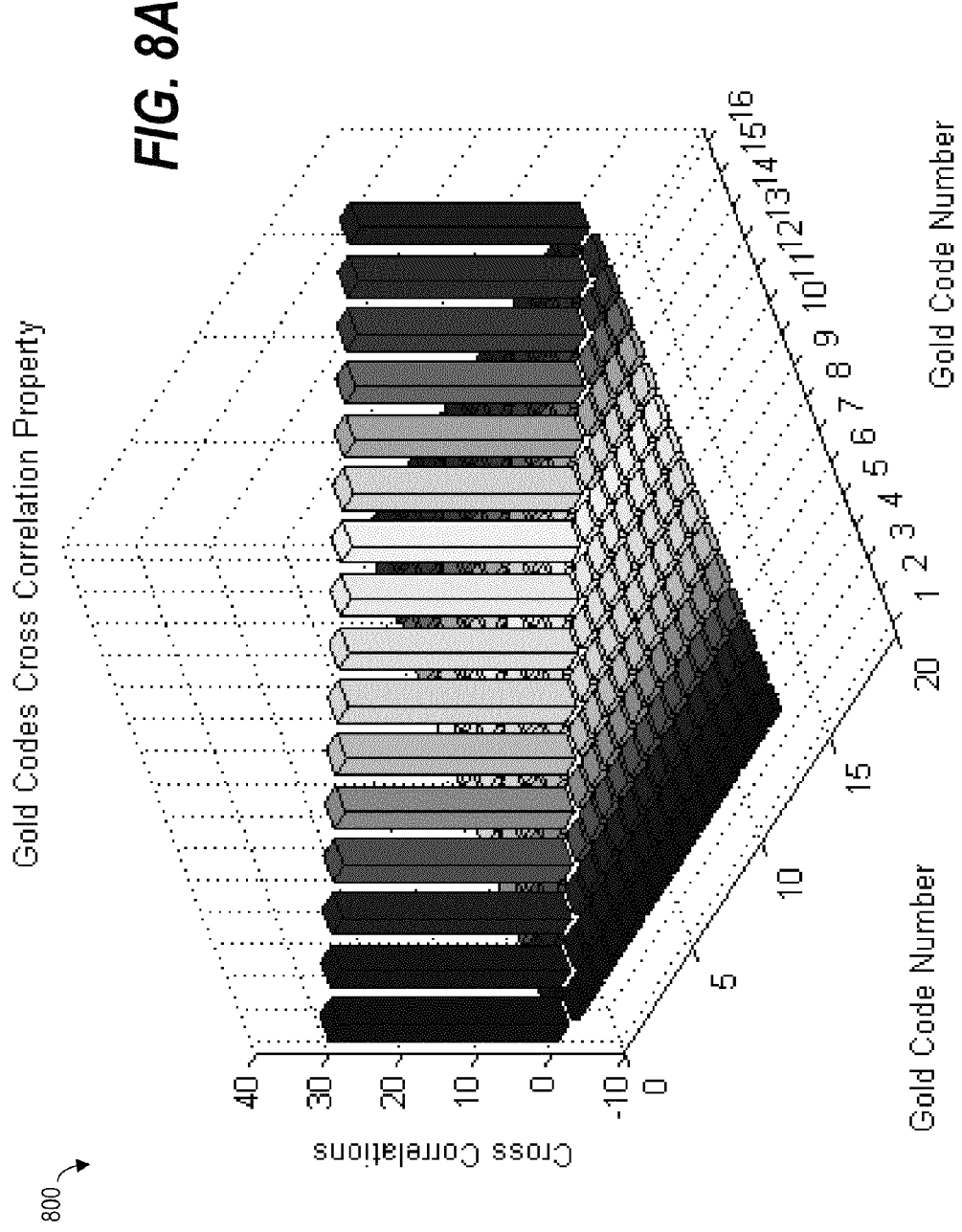
FIG. 8A is a graphical representation of characteristics of Gold codes, in accordance with some embodiments.

Referring to FIG. 8A, as shown by graphical representation 800, in some embodiments, Gold encoded signals may include a plurality of Gold encoded signals (e.g., represented as Gold code number 1 to 16), each having a high auto correlation (compared with itself) and a low cross correlation (compared each of the others of the plurality of Gold encoded signals). In some embodiments, the plurality of Gold encoded signals may have a uniformly high auto correlation and a uniformly low cross correlation.

Figure 8B:
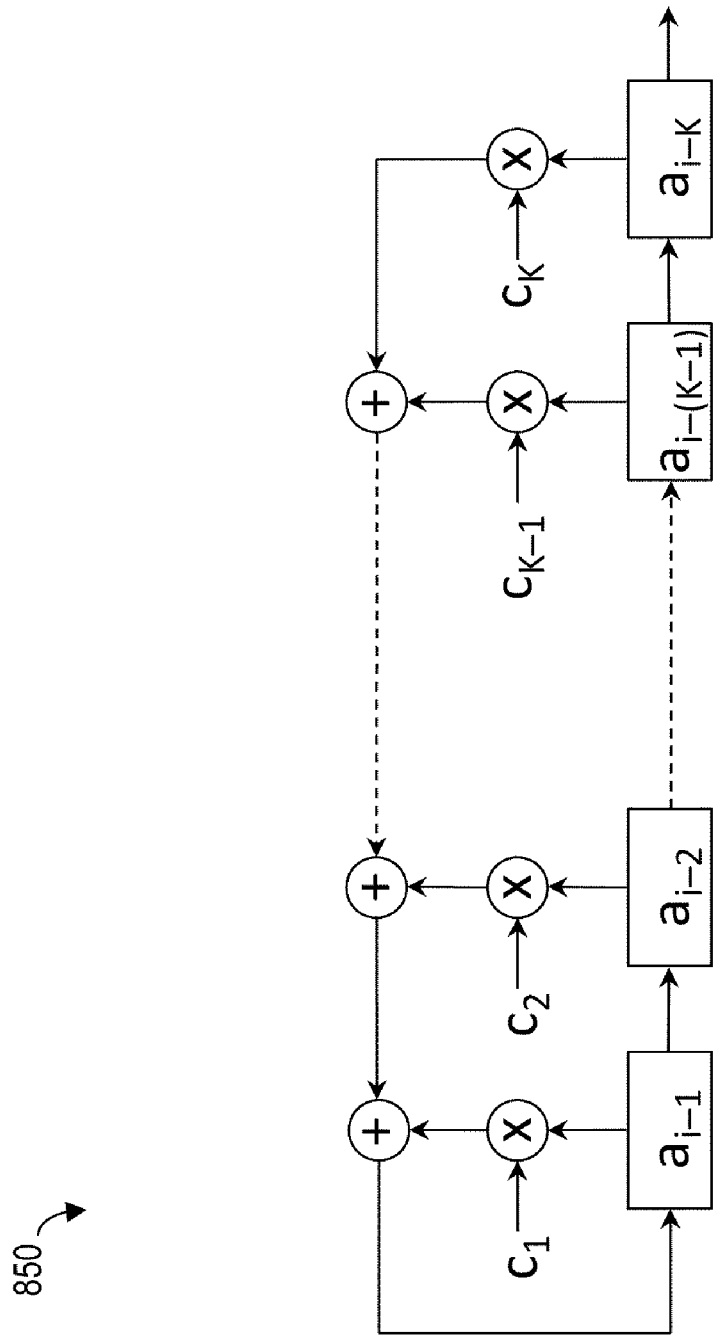
FIG. 8B is a schematic diagram of a maximum length shift register, in accordance with some embodiments.

In some embodiments, the Gold encoded signals are generated in accordance with FIG. 8B, which shows the structure 850 of the well known maximum length Linear Feedback Shift Register (LFSR) sequences.

Referring to FIG. 8B, maximum length sequences (MLS) are, by definition, the largest codes that can be generated by a given shift register, $\{a_k\}$, or a delay element of a given LFSR length, K. Typically the connectors of the shift register are described by the coefficients of the polynom, $\{c_k\}$. Every LFSR sequence shows a periodicity that depends on the length of the LFSR itself as $2^{K-1}$. It can be demonstrated that the number of ones and zeros in a MLS is nearly equal and its autocorrelation is $N\delta(n)$, where N is the length of the MLS and $\delta(\cdot)$ denotes the Dirac delta function.

The autocorrelation refers to the degree of correspondence between a sequence and a phase-shifted replica of itself. This characteristic autocorrelation is used to great advantage in Spread Spectrum (SS) schemes such as CDMA, and it is of most interest in choosing code sequences that give the least false synchronization probability. With the above characteristics, an MLS is nearly indistinguishable from a pure random code when N is large.

In some embodiments, the cross correlation of two codes is of similar importance. The cross correlation is the measure of agreement between two different codes. The MLS are not immune to cross correlation problems, and they may have large cross correlation values. A lower bound of the cross correlation for the MLS is $\sqrt{2^{K-1}}$.

In some embodiments, the goal of SS technique designers is to find a set of spreading codes or waveforms such that many signals as possible can be spread in a band of frequencies such that there is a little mutual interference. Gold Codes are useful because of the larger number of sequences they supply. The Gold codes can be chosen from a set of codes available for a given generator, and their cross correlation is uniform and bounded.

In some embodiments, the Gold codes construction depends on two preferred pair of MLS with length N. Consider that a MLS is denoted by A, and the second MLS is denoted as B. The $2^{K-1}$ Gold codes are built by adding the sequence A and the shifted version of B once per time. The cross correlation values for any GC are in the set $\{-1, 2N-1\}$, see Fig. X for a 15 bit-long example.

Figure 9:
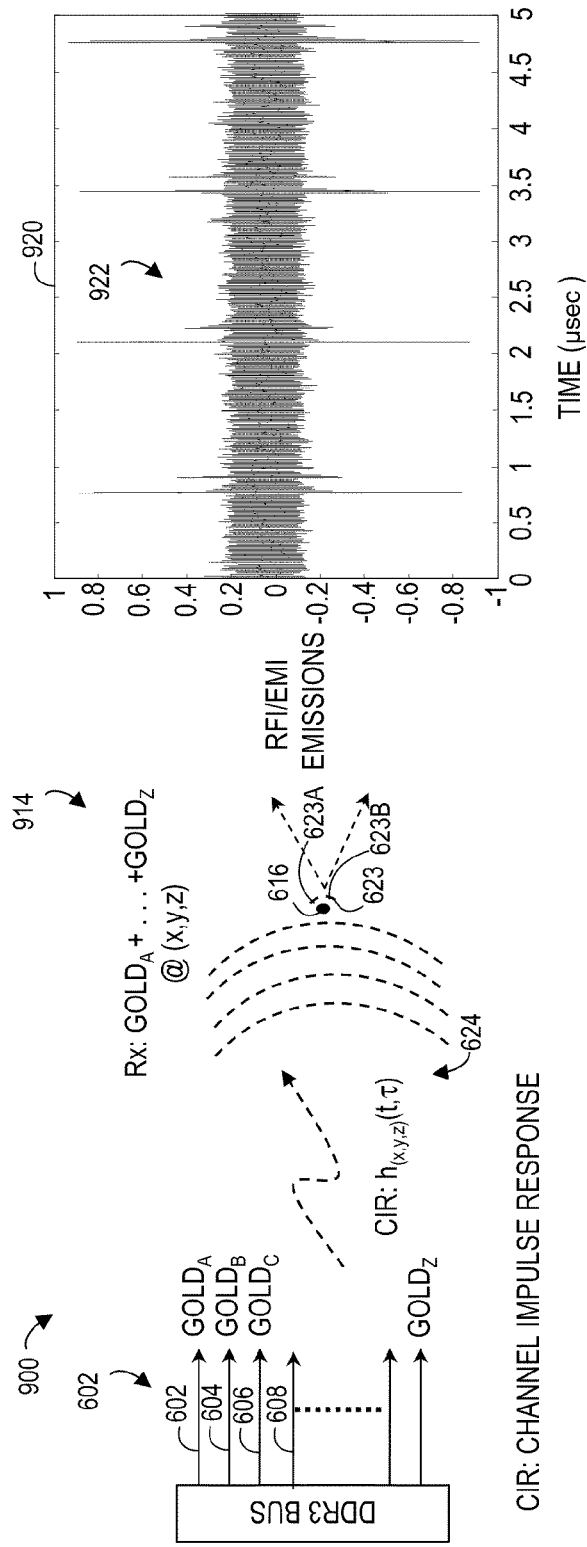
FIG. 9 is a graphical representation of a portion of a method, in accordance with some embodiments.

FIG. 9 is a graphical representation 900 showing portion 404 of method 400 with the communication interface 602 and Gold encoded signals, in accordance with some embodiments.

Referring to FIG. 9, in accordance with some embodiments, a different GOLD encoded signal may be supplied to each conductor in the communication interface. Thus, a first signal, i.e., $GOLD_A$ or other signal, may be supplied to the first conductor 602 in the communication interface. A second signal, i.e., $GOLD_B$ or other signal, may be supplied to the second conductor 604 in the communication interface. A third signal, i.e., $GOLD_C$ or other signal, may be supplied to the third conductor 606 in the communication interface. And so on.

The signals may result in interference 914, which may have different characteristics at different locations. The interference may be detected at one or more locations of interest, e.g., location 616. A graph 920 has a waveform 922 representing the interference that may be detected at location 616, in accordance with some embodiments.

Referring again to FIG. 4, at 406, the method may further include, for each of the plurality of communication interfaces, determining an estimate of interference that would occur at the location as a result of emissions radiated from the communication interface while the signals are supplied thereto, based at least in part on the characterization of the channel between the location and the communication interface.

In some embodiments, determining an estimate of interference that would occur at the location as a result of emissions radiated from the communication interface while the signals are supplied thereto, comprises determining a convolution based on information representing the signals supplied to the communication interface (e.g., FIG. 8A) and the characterization of the channel between the location and the communication interfaces (e.g., FIG. 7, table 720, column 731).

Referring again to FIG. 4, at 408, the method may further include, for each of the plurality of communication interfaces, comparing the estimate of interference that would occur at the location to the detected interference that occurs at the location.

In some embodiments, this comprises determining a measure of correlation between the estimate of interference that would occur at the location and the detected interference that occurs at the location. In some embodiments, the measure of correlation may be determined by determining a convolution based on the estimate of interference that would occur at the location and the detected interference that occurs at the location. In some embodiments, the communication interface for which the measure of correlation is greatest will be the communication interface that results in the greatest amount of interference at the location.

At 412, the method may further include identifying a communication interface and/or one or more conductors in the communication interface that result in an undesirable amount of interference at the location of interest. In some embodiments, this may comprise identifying the communication interface for which the measure of correlation between the estimate and the detected interference is greatest. In some embodiments, the communication interface may result in a greatest amount (or at least one of the greatest amounts) of interference at a location of interest. In some embodiments, the communication interface may result in an unacceptable amount of interference at a given location of interest.

In some embodiments, after such source is identified, efforts may be made to mitigate such interference, which may thereby improve system performance in one or more respects. Moreover, if such source can be identified and the interference mitigated, it may be possible to reduce spacing between one or more components within the system, which may make it possible to reduce one or more overall dimension of the system and/or to optimize said system for optimal coexistence of computing and communications subsystems, all within a definable volumetric form (e.g., a mobile device).

At 414, the method may further include modifying a design of one or more systems in response at least in part to the comparison. In some embodiments, this comprises modifying a system that includes one or more integrated circuit package. In some embodiments it comprises modifying one or more of such one or more integrated circuit packages.

In accordance with some embodiments, the interference, the CIR and the channel PDP are time and space dependent and a space-time interference signal identification is feasible as well.

In some embodiments, the system 100 may have more or fewer components than that shown.

In some embodiments, some or all portions of the information described in association with the method 400 is stored in one or more storage devices.

In some embodiments, one or more portions of the method 400 may be performed by a processor.

In some embodiments, a computer-readable storage medium may store thereon instructions that when executed by a processor result in performance of one or more portions of the method 400.

Figure 10:
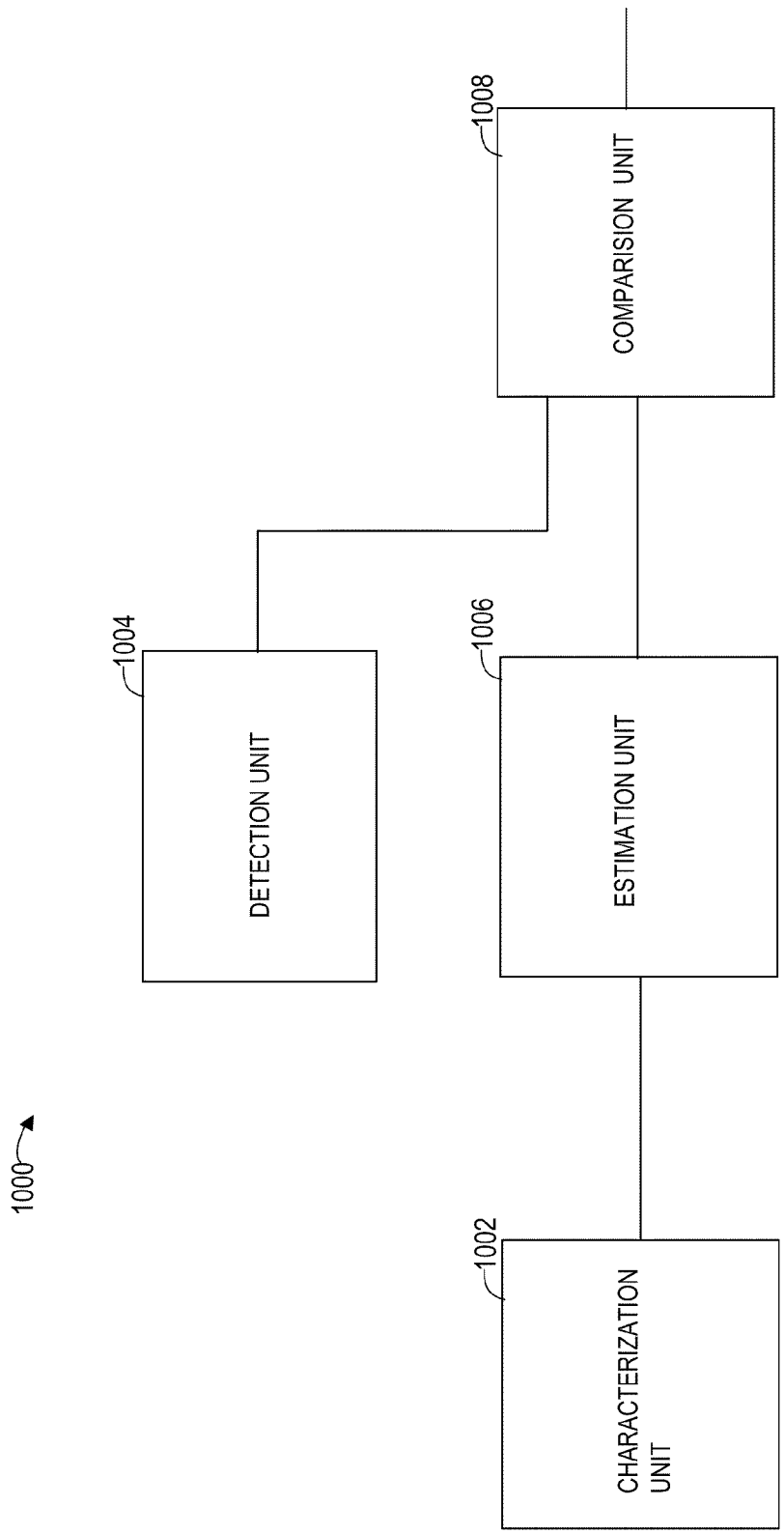
FIG. 10 is a block diagram of an apparatus, in accordance with some embodiments.

FIG. 10 is a block diagram of an apparatus 1000 according to some embodiments. In some embodiments, the apparatus may be used in identifying a communication interface that results in a greatest amount (or at least one of the greatest amounts), an unacceptable amount and/or merely an undesirable amount of interference at a given location of interest, according to some embodiments.

Referring to FIG. 10, the apparatus may include a characterization unit 1002, a detection unit 1004, an estimation unit 1008 and a comparison unit 1008. In some embodiments, the characterization unit 1002, the detection unit 1004, the estimation unit 1008 and the comparison unit 1008 may perform portions 402, 404, 406 and 408, respectively, of method 400.

The characterization unit 1002 may characterize a plurality of channels, each of the plurality of channels being a channel between a location and a respective one of the plurality of communication interfaces.

In some embodiments, the characterization unit 1002 receives information defining the plurality of communication interfaces, information dividing the conductors of the interfaces into groups, information indicative of signals supplied to one of the groups at a time, and information indicative of detected interference that occurs at the location as a result of emissions radiated from the group while signals are supplied thereto. The characterization unit 1002 may thereafter characterize the plurality of channels based at least in part on the information received thereby.

In some embodiments, the characterization unit 1002 characterizes a channel between the location and a group of conductors by estimating a channel power delay profile (PDP) or other statistical measure of average power or statistical measure of behavior based at least in part on the interference that was detected at the location of interest with the signals supplied to the group.

In some embodiments, each of the groups has a same number of conductors. In some embodiments, the number of conductors in each group is two (sometimes referred to as a pair of conductors).

In some embodiments, the signals are Golay encoded signals. If the number of conductors in a group is equal to two, a first Golay encoded signal may be supplied to a first conductor in the group and a second Golay encoded signals may be supplied to a second conductor in the group. In some embodiments, the Golay encoded signals may have the characteristics shown in FIG. 5, which is a representation of channel sounding characteristics of Golay Complementary Codes, in accordance with some embodiments.

In some embodiments, the characterization unit 1002 may be coupled to a transmitter that transmits the signals that result in the emissions. In some embodiments, the characterization unit 1002 may supply the signals to the transmitter. In some embodiments, the transmitter may be the same as and/or similar to the transmitter 613.

In some embodiments, the characterization unit 1002 may be coupled to ad/or include a detector that detects the interference that occurs at the location as a result of emissions radiated from the group while signals are supplied thereto. In some embodiments, the detector may be the same as and/or similar to the detector 623.

As stated above, In some embodiments, the characterization unit 1002 may characterize a channel by estimating a channel power delay profile (PDP) or other statistical measure of average power or statistical measure of behavior, based at least in part on the interference that was detected at the location of interest with the signals supplied to the group. A graph 626 has a waveform 628 representing an estimated channel power delay profile (PDP), in accordance with one embodiment. In some embodiments, the characterization unit 1002 use a transformation to generate the estimated channel power delay profile (PDP), based at least in part on the interference that was detected at the location of interest with the signals supplied to the group. In some embodiments, the transformation may be the same as and/or similar to the transformation 630.

In some embodiments, the characterization unit 1002 may repeat the above for each group of conductors in the communication interface 602 and each group of conductors in each of the other communication interfaces.

The detection unit 1004 may detect, for each of the plurality of interfaces, interference that occurs at the location as a result of emissions radiated from the communication interface while signals are supplied thereto. In some embodiments, the signals may be supplied to, and interference may be detected from, one of the plurality of communication interfaces at a time.

In some embodiments, the detection unit 1004 may be coupled to a transmitter that transmits the signals that result in the emissions detected by the detection unit 1004. In some embodiments, the detection unit 1004 may supply the signals to the transmitter. In some embodiments, the transmitter may be the same as and/or similar to the transmitter 613.

In some embodiments, the detection unit 1004 may be coupled to and/or include a detector that detects the interference that occurs at the location as a result of emissions radiated from the group while signals are supplied thereto. In some embodiments, the detector may be the same as and/or similar to the detector 623.

In some embodiments, a different signal is supplied to each conductor in the communication interface. In some embodiments, the signals supplied to the communication interface are signals having low cross correlation properties and/or high autocorrelation properties. In some embodiments, the signals supplied to the communication interface are Gold encoded signals. In some embodiments, the Gold encoded signals may have the characteristics shown in FIG. 8A. In some embodiments, the Gold encoded signals are generated in accordance with FIG. 8B.

In some embodiments, the signals may be supplied and the interference may be detected in a manner that is the same as and/or similar to that shown in FIG. 9. For example, in some embodiments, a different GOLD encoded signal may be supplied to each conductor in the communication interface. The signals may result in interference 914, which may have different characteristics at different locations. The interference may be detected at one or more locations of interest, e.g., location 616. A graph 920 has a waveform 922 representing the interference that may be detected at location 616, in accordance with some embodiments.

The estimation unit 1006 may determine, for each of the plurality of communication interfaces, an estimate of interference that would occur at the location as a result of emissions radiated from the communication interface while the signals are supplied thereto.

In some embodiments, the estimation unit 1006 receives information indicative of the signals supplied to the communication interface (e.g., FIG. 8A) and may further receive the characterization of the channel between the location and the communication interfaces (e.g., FIG. 7, table 720, column 731). The estimation unit 1006 may thereafter determine the estimate based at least in part on the information received thereby. In some embodiments, the estimation unit 1006 determines the estimate based on a convolution of the information indicative of the signals supplied to the communication interface (e.g., FIG. 8A) and the characterization of the channel between the location and the communication interfaces (e.g., FIG. 7, table 720, column 731).

The comparison unit 4008 may compare, for each of the plurality of communication interfaces, the estimate of interference that would occur at the location to the detected interference that occurs at the location. In some embodiments, the comparison comprises a determination of a measure of correlation between the estimate of interference that would occur at the location and the detected interference that occurs at the location. In some embodiments, the measure of correlation may be determined by determining a convolution based on the estimate of interference that would occur at the location and the detected interference that occurs at the location.

In some embodiments, the comparison unit 1008 may identify a communication interface and/or one or more conductors in the communication interface that result in an undesirable amount of interference at the location of interest. In some embodiments, this identification may comprise identifying the communication interface for which the measure of correlation between the estimate and the detected interference is greatest. In some embodiments, such communication interface may result in a greatest amount (or at least one of the greatest amounts) of interference at a location of interest and/or an unacceptable amount of interference at a given location of interest.

Although shown separately, in some embodiments, one or more of the characterization unit 1002, the detection unit 1004, the estimation unit 1008 and the comparison unit 1008 may be combined into a single unit.

In some embodiments, some or all portions of the information that is received and/or produced by the characterization unit 1002, the detection unit 1004, the estimation unit 1008 and/or the comparison unit 1008 may be stored in one or more storage devices. In some embodiments, some or all portions of the information that is received and/or produced by the characterization unit 1002, the detection unit 1004, the estimation unit 1008 and/or the comparison unit 1008 may be stored by the characterization unit 1002, the detection unit 1004, the estimation unit 1008 and/or the comparison unit 1008, respectively.

The methods, apparatus, systems computer readable mediums disclosed herein are not limited to use in association with systems such as system 100. Thus, although the system 100 comprises two integrated circuit packages and a circuit board, the methods, apparatus, systems computer readable mediums disclosed herein are not limited to use in association with such type of systems.

Figure 11:
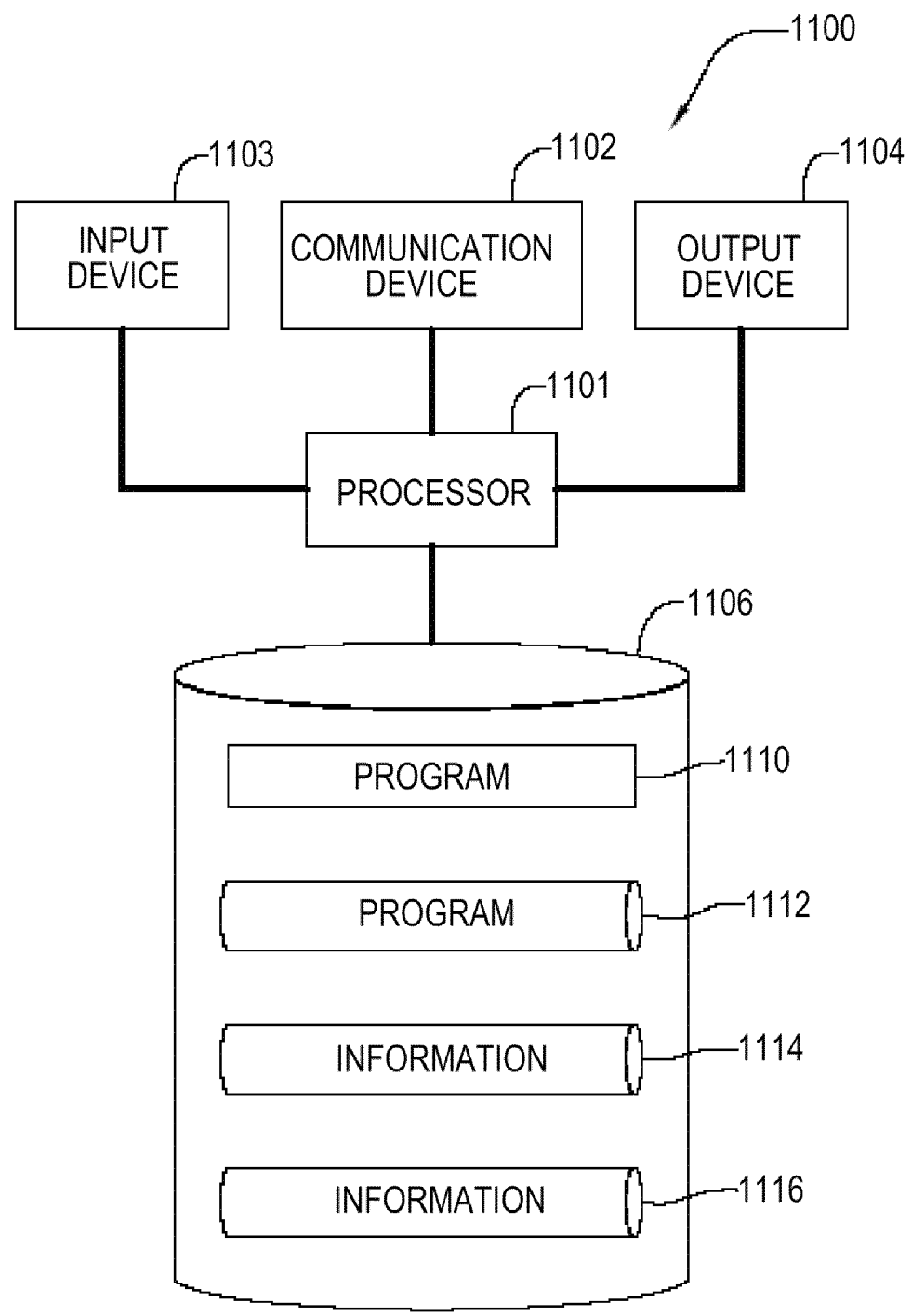
FIG. 11 is a block diagram of an architecture, in accordance with some embodiments.

FIG. 11 is a block diagram of an architecture 1100 according to some embodiments. In some embodiments, one or more of the systems (or portion(s) thereof) disclosed herein, apparatus (or portion(s) thereof) disclosed herein and/or one or more devices (or portion(s) thereof) disclosed herein may have an architecture that is the same as and/or similar to the architecture 1100 (or portion(s) thereof). In some embodiments, one or more of the methods (or portion(s) thereof) disclosed herein may be performed by system, apparatus and/or devices having an architecture that is the same as and/or similar to the architecture 1100 (or portion(s) thereof).

Referring to FIG. 11, in accordance with some embodiments, the architecture 1100 includes a processor 1101 coupled to a communication device 1102, an input device 1103, an output device 1104 and a storage device 1106.

In some embodiments, the processor 1101 may execute processor-executable program code to provide or otherwise result in one or more portions of one or more functions and/or one or more portions of one or more methods disclosed herein. In some embodiments, the processor 1101 may comprise one or more INTEL® Pentium® processors.

The communication device 1102 may be used to facilitate communication with other devices and/or systems. In some embodiments, communication device 1102 may comprise an Ethernet and/or other type of connection to a network and/or resource and through which apparatus 1100 may receive and/or transmit information.

The input device 1103 may be used to input information. In some embodiments, the input device 1103 may comprise a keyboard, a keypad, a track ball, a touchpad, a mouse or other pointing device, a microphone, a knob or a switch, an infrared (IR) port and/or a computer media reader.

The output device 1104 may be used to output information. In some embodiments, the output device 1104 may comprise an IR port, a docking station, a display, a speaker and/or a printer.

The storage device 1106 may store one or more programs 1110-1112 and/or other information for operation of the architecture 1100. In some embodiments, the one or more programs and/or other information may include one or more operating systems, one or more database management systems and/or other applications for operation of the architecture 1100. In some embodiments, the one or more programs 1110-1112 may include one or more instructions to be executed by the processor 1101 to provide one or more portions of one or more functions and/or one or more portions of one or more methods disclosed herein. In some embodiments, the one or more programs and/or other information may include one or more databases 1114-1116.

In some embodiments, the storage device 906 may comprise one or more storage devices, such as, for example, magnetic storage devices (e.g., magnetic tape and/or hard disk drives), optical storage devices, and/or semiconductor memory devices such as Random Access Memory (RAM) devices and Read Only Memory (ROM) devices.

In some embodiments, one or more portions of one or more embodiments disclosed herein may be embodied in a system, a method, an apparatus and/or a computer-readable storage medium. A computer-readable storage medium may store thereon instructions that when executed by a processor result in performance of a process according to any of the embodiments described herein.

Unless stated otherwise, a communication interface may comprise any type of communication interface. In some embodiments, one or more of the plurality of communication interfaces is a bus and/or an interconnection (e.g., a wired interconnection). However, in some embodiments, one or more of the communication interfaces is not limited to a bus and/or wired interconnection.

Unless stated otherwise, a location and/or location of interest may comprise any type of location and/or location of interest, respectively. In some embodiments, a location and/or location of interest may be as small as a single point in space. In some other embodiments, a location and/or location of interest may comprise a region and/or region of interest, respectively, that is larger than a single point in space. In some embodiments, a location and/or location of interest may comprise a three dimensional region that is as large as test personnel feel is appropriate and/or may be desired to accomplish a particular objective.

Unless stated otherwise, a processor may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. A processor may employ continuous signals, periodically sampled signals, and/or any combination thereof. If a processor is distributed, two or more portions of the processor may communicate with one another through a communication link.

In addition, unless stated otherwise, a communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols.

In addition, unless stated otherwise, a "database" may comprise one or more related or unrelated databases.

In addition, unless stated otherwise, data may comprise any type of information and may have and/or be stored in any form. In some embodiments, data may be stored in raw, excerpted, summarized and/or analyzed form.

Unless otherwise stated, terms such as, for example, "in response to" and "based on" mean "in response at least to" and "based at least on", respectively, so as not to preclude being responsive to and/or based on, more than one thing.

Unless otherwise stated, terms such as, for example, "electrically connected" mean "directly electrically connected" and/or "indirectly electrically connected".

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

The several embodiments described herein are solely for the purpose of illustration. Other embodiments may be practiced with modifications and alterations limited only by the claims.

What is claimed is:

1. A method comprising:
    characterizing a plurality of channels, each of the plurality of channels being a channel between a location and a respective one of the plurality of communication interfaces;
    for each of the plurality of communication interfaces, supplying signals to the communication interface and detecting interference that occurs at the location as a result of emissions radiated from the plurality of communication interface while the signals are supplied thereto;
    for each of the plurality of communication interfaces, determining an estimate of interference that would occur at the location as a result of emissions radiated from the communication interface while the signals are supplied thereto, based at least in part on the characterization of the channel between the location and the communication interface; and
    for each of the plurality of communication interfaces, comparing, using a processor that includes hardware, the estimate of interference that would occur at the location to the detected interference that occurs at the location.

2. The method of claim 1 wherein characterizing a channel between a location and a respective one of the communication interfaces comprises:
    dividing conductors of the respective one of the communication interface into groups; and
    supplying signals to one of the groups at a time, and for each of the groups, detecting interference that occurs at the location as a result of emissions radiated from the group while the signals are supplied thereto and thereafter characterizing a channel between the location and the group.

3. The method of claim 2 wherein a channel between the location and a group of conductors is characterized by estimating a statistical measure of behavior based at least in part on the interference that was detected at the location of interest with the signals supplied to the group.

4. The method of claim 2 wherein the channel between the location and the group of conductors is characterized by estimating a channel power delay profile based at least in part on the interference that was detected at the location of interest with the signals supplied to the group.

5. The method of claim 2 wherein the signals supplied to the one of the groups at a time are Golay encoded signals.

6. The method of claim 1 wherein the signals are Gold encoded signals.

7. The method of claim 1 wherein determining an estimate of interference that would occur at the location as a result of emissions radiated from the communication interface while the signals are supplied thereto, comprises:
    determining a convolution based on information representing the signals supplied to the communication interface and the characterization of the channel between the location and the communication interfaces.

8. The method of claim 1 wherein comparing the estimate of interference that would occur at the location to the detected interference that occurs at the location comprises:
    determining a measure of correlation between the estimate of interference that would occur at the location and the detected interference that occurs at the location.

9. The method of claim 1 wherein comparing the estimate of interference that would occur at the location to the detected interference that occurs at the location comprises:
    determining a convolution based on the estimate of interference that would occur at the location and the detected interference that occurs at the location.

10. The method of claim 1 further identifying a communication interface that results in an undesired amount of interference at the location based at least in part on the comparison.

11. The method of claim 1 further comprising modifying a design of one or more systems in response at least in part to the comparison.

12. The method of claim 1 further comprising modifying a design of an integrated circuit package in response at least in part to the comparison.

13. The method of claim 1 wherein the processor that includes hardware executes processor-executable program code.

14. The method of claim 1 wherein the characterizing a plurality of channels comprises characterizing the plurality of channels using a processor that includes hardware.

15. The method of claim 1 wherein the determining an estimate of interference comprises determining an estimate of interference using a processor that includes hardware.

16. The method of claim 1 wherein the characterizing a plurality of channels comprises characterizing the plurality of channels using a processor that includes hardware, and wherein the determining an estimate of interference comprises determining an estimate of interference using a processor that includes hardware.

17. A non-transitory computer readable medium storing thereon instructions executable by a processor to result in performance of a method comprising:
    characterizing a plurality of channels, each of the plurality of channels being a channel between a location and a respective one of the plurality of communication interfaces;
    receiving, for each of the plurality of communication interfaces, information indicative of interference that occurs at the location as a result of emissions radiated from the plurality of communication interface while signals are supplied thereto;

for each of the plurality of communication interfaces, determining an estimate of interference that would occur at the location as a result of emissions radiated from the communication interface while the signals are supplied thereto, based at least in part on the characterization of the channel between the location and the communication interface; and for each of the plurality of communication interfaces, comparing the estimate of interference that would occur at the location to the detected interference that occurs at the location.

18. The computer readable medium of claim 17 wherein characterizing a channel between a location and a respective one of the communication interfaces comprises:

receiving information dividing conductors of the respective one of the communication interface into groups;

receiving, for each of the groups, information indicative of interference that occurs at the location as a result of emissions radiated from the group while the signals are supplied thereto; and thereafter characterizing a channel between the location and the group.

19. The computer readable medium of claim 18 wherein a channel between the location and a group of conductors is characterized by estimating a statistical measure of behavior based at least in part on the interference that was detected at the location of interest with the signals supplied to the group.

20. The computer readable medium of claim 18 wherein the channel between the location and the group of conductors is characterized by estimating a channel power delay profile based at least in part on the interference that was detected at the location of interest with the signals supplied to the group.

21. The computer readable medium of claim 18 wherein the signals supplied to the one of the groups at a time are Golay encoded signals.

22. The computer readable medium of claim 17 wherein the signals are Gold encoded signals.

23. The computer readable medium of claim 17 wherein determining an estimate of interference that would occur at the location as a result of emissions radiated from the communication interface while the signals are supplied thereto, comprises:

determining a convolution based on information representing the signals supplied to the communication interface and the characterization of the channel between the location and the communication interfaces.

24. The computer readable medium of claim 17 wherein comparing the estimate of interference that would occur at the location to the detected interference that occurs at the location comprises:

determining a measure of correlation between the estimate of interference that would occur at the location and the detected interference that occurs at the location.

25. The computer readable medium of claim 17 wherein comparing the estimate of interference that would occur at the location to the detected interference that occurs at the location comprises:

determining a convolution based on the estimate of interference that would occur at the location and the detected interference that occurs at the location.

26. The computer readable medium of claim 17 wherein the method further comprises identifying a communication interface that results in an undesired amount of interference at the location based at least in part on the comparison.

27. Apparatus comprising:

a characterization unit to characterize a plurality of channels, each of the plurality of channels being a channel between a location and a respective one of the plurality of communication interfaces;

a unit to receive, for each of the plurality of communication interfaces, information indicative of interference that occurs at the location as a result of emissions radiated from the plurality of communication interface while signals are supplied thereto;

an estimation unit to determine, for each of the plurality of communication interfaces, an estimate of interference that would occur at the location as a result of emissions radiated from the communication interface while the signals are supplied thereto, based at least in part on the characterization of the channel between the location and the communication interface; and a comparison unit to compare, for each of the plurality of communication interfaces, the estimate of interference that would occur at the location to the detected interference that occurs at the location.

28. The apparatus of claim 27 wherein characterization of a channel between a location and a respective one of the communication interfaces comprises:

receiving information dividing conductors of the respective one of the communication interface into groups; and receiving, for each of the groups, information indicative of interference that occurs at the location as a result of emissions radiated from the group while the signals are supplied thereto; and thereafter characterizing a channel between the location and the group.

29. The apparatus of claim 28 wherein a channel between the location and a group of conductors is characterized by estimating a statistical measure of behavior based at least in part on the interference that was detected at the location of interest with the signals supplied to the group.

30. The apparatus of claim 28 wherein the channel between the location and the group of conductors is characterized by estimating a channel power delay profile based at least in part on the interference that was detected at the location of interest with the signals supplied to the group.

31. The apparatus of claim 28 wherein the signals supplied to the one of the groups at a time are Golay encoded signals.

32. The apparatus of claim 27 wherein the signals are Gold encoded signals.

33. The apparatus of claim 27 wherein determination of the estimate of interference that would occur at the location as a result of emissions radiated from the communication interface while the signals are supplied thereto, comprises:

determination of a convolution based on information representing the signals supplied to the communication interface and the characterization of the channel between the location and the communication interfaces.

34. The apparatus of claim 27 wherein comparison of the estimate of interference that would occur at the location to the detected interference that occurs at the location comprises:

determination of a measure of correlation between the estimate of interference that would occur at the location and the detected interference that occurs at the location.

35. The apparatus of claim 27 wherein comparison of the estimate of interference that would occur at the location to the detected interference that occurs at the location comprises:

determination of a convolution based on the estimate of interference that would occur at the location and the detected interference that occurs at the location.

36. The apparatus of claim 27 wherein the comparison unit is further to identify a communication interface that results in an undesired amount of interference at the location based at least in part on the comparison.

* * * * *